(12) United States Patent
Hurd et al.

(10) Patent No.: US 8,944,449 B2
(45) Date of Patent: Feb. 3, 2015

(54) SIDE-BY-SIDE VEHICLE

(75) Inventors: Chris J. Hurd, Hugo, MN (US);
Richard D. Ripley, Rush City, MN (US); Anthony J. Kinsman, Wyoming, MN (US); Matthew S. Kmecik, North Branch, MN (US); Brent A. Erspamer, Blaine, MN (US); Ryan D. Carlson, Blaine, MN (US)

(73) Assignee: Polaris Industries Inc., Medina, MN (US)

( * ) Notice: Subject to any disclaimer, the term of this patent is extended or adjusted under 35 U.S.C. 154(b) by 171 days.

(21) Appl. No.: 13/077,321

(22) Filed: Mar. 31, 2011

(65) Prior Publication Data

US 2011/0240393 A1 Oct. 6, 2011

Related U.S. Application Data

(60) Provisional application No. 61/321,455, filed on Apr. 6, 2010.

(51) Int. Cl.
| | |
|---|---|
| *B60G 21/055* | (2006.01) |
| *B60K 5/00* | (2006.01) |
| *B62D 21/00* | (2006.01) |
| *B62D 21/18* | (2006.01) |
| *B62D 49/02* | (2006.01) |
| *B60G 3/20* | (2006.01) |

(52) U.S. Cl.
CPC ............. *B60K 5/00* (2013.01); *B60G 21/0551* (2013.01); *B60G 2204/1224* (2013.01); *B62D 21/00* (2013.01); *B62D 21/186* (2013.01); *B62D 49/02* (2013.01); *B60G 2204/122* (2013.01); *B60G 3/20* (2013.01); *B60G 21/055* (2013.01); *B60G 2200/144* (2013.01); *B60G 2300/13* (2013.01)

USPC ...... 280/124.152; 280/124.106; 280/124.107; 280/291

(58) Field of Classification Search
CPC ............. B60G 21/055; B60G 21/0551; B60G 2204/1224; B60G 2204/122; B60K 5/00; B62D 21/00; B62D 21/186; B62D 49/02
USPC .................. 180/233, 292, 364, 90, 248, 291; 280/124.152, 124.103, 124.106, 280/124.107
See application file for complete search history.

(56) References Cited

U.S. PATENT DOCUMENTS 3,210,092 A * 10/1965 Kraus ..................... 280/124.152
3,709,314 A * 1/1973 Hickey .......................... 180/249
(Continued)

FOREIGN PATENT DOCUMENTS

| DE | 102005013567 | 9/2006 |
|---|---|---|
| EP | 1384606 | 7/2003 |

(Continued)

OTHER PUBLICATIONS

Bobcat, 2008 Bobcat 2300 4X4—Bed Toys, Four Wheeler Magazine, Feb. 2009, 3 pgs.

(Continued)

*Primary Examiner* — Karen Beck
(74) *Attorney, Agent, or Firm* — Faegre Baker Daniels LLP

(57) ABSTRACT

A vehicle is disclosed. The vehicle may include a hydraulic system. The vehicle may include a sway bar. The sway bar may be positioned rearward of a hydraulic pump of the hydraulic system. A console having a first hydraulic input may be provided in an operator area of the vehicle.

30 Claims, 33 Drawing Sheets

(56) References Cited

U.S. PATENT DOCUMENTS

| | | | |
|---|---|---|---|
| 3,858,901 | A | 1/1975 | Johnson |
| 3,990,725 | A * | 11/1976 | Allison .................. 280/124.146 |
| 4,022,494 | A * | 5/1977 | Allison .................. 280/124.167 |
| 4,478,105 | A * | 10/1984 | Yamamuro et al. .......... 74/731.1 |
| 4,773,675 | A * | 9/1988 | Kosuge .......................... 280/781 |
| 4,955,852 | A * | 9/1990 | Morisawa ...................... 475/146 |
| 5,074,374 | A | 12/1991 | Ohtake et al. |
| 5,327,989 | A * | 7/1994 | Furuhashi et al. ............. 180/248 |
| 5,669,813 | A | 9/1997 | Jairazbhoy et al. |
| 6,056,078 | A * | 5/2000 | Pham ............................ 180/219 |
| 6,070,689 | A * | 6/2000 | Tanaka et al. ................. 180/291 |
| 6,343,237 | B1 | 1/2002 | Rossow et al. |
| 6,414,607 | B1 | 7/2002 | Gonring et al. |
| 6,651,768 | B2 | 11/2003 | Fournier et al. |
| 6,789,812 | B2 * | 9/2004 | Peterson ................ 280/124.152 |
| 6,942,227 | B2 * | 9/2005 | Heller et al. ................ 280/5.502 |
| 7,147,078 | B2 * | 12/2006 | Teslak et al. ................... 180/305 |
| 7,562,944 | B2 * | 7/2009 | Walker ............................ 303/10 |
| 7,571,073 | B2 | 8/2009 | Gamberini et al. |
| 7,575,088 | B2 | 8/2009 | Mir et al. |
| 7,591,472 | B2 * | 9/2009 | Kinjyo et al. .......... 280/124.152 |
| 7,665,299 | B2 | 2/2010 | Schuh et al. |
| 7,690,661 | B2 * | 4/2010 | Tsuruta et al. .......... 280/124.135 |
| 7,708,103 | B2 | 5/2010 | Okuyama et al. |
| 7,819,220 | B2 * | 10/2010 | Sunsdahl et al. .............. 180/312 |
| 8,100,434 | B2 * | 1/2012 | Miura ............................. 280/781 |
| 8,225,901 | B2 * | 7/2012 | Ohtsuki et al. ................ 180/312 |
| 8,226,155 | B2 | 7/2012 | Hill et al. |
| 8,517,136 | B2 | 8/2013 | Hurd et al. |
| 8,522,911 | B2 | 9/2013 | Hurd et al. |
| 8,662,239 | B2 * | 3/2014 | Takagi ........................... 180/291 |
| 2004/0206568 | A1 * | 10/2004 | Davis et al. ................... 180/311 |
| 2004/0217568 | A1 * | 11/2004 | Gradu ..................... 280/124.107 |
| 2005/0110228 | A1 * | 5/2005 | Fujimori .................... 280/5.511 |
| 2005/0173177 | A1 * | 8/2005 | Smith et al. .................... 180/233 |
| 2007/0001417 | A1 * | 1/2007 | Minoshima ............ 280/124.107 |
| 2007/0023221 | A1 | 2/2007 | Okuyama et al. |
| 2008/0053738 | A1 * | 3/2008 | Kosuge et al. ................. 180/311 |
| 2008/0257630 | A1 * | 10/2008 | Takeshima et al. ............ 180/248 |
| 2008/0283324 | A1 * | 11/2008 | Iwaki et al. .................... 180/242 |
| 2008/0284124 | A1 * | 11/2008 | Brady et al. ............ 280/124.135 |
| 2009/0302590 | A1 * | 12/2009 | Van Bronkhorst et al. ... 280/756 |
| 2010/0078256 | A1 * | 4/2010 | Kuwabara et al. ............. 180/337 |
| 2010/0174456 | A1 * | 7/2010 | Beaudoin et al. ............... 701/51 |
| 2011/0094818 | A1 * | 4/2011 | Suzuki et al. .................. 180/292 |
| 2011/0209937 | A1 * | 9/2011 | Belzile et al. ................. 180/291 |
| 2011/0240250 | A1 * | 10/2011 | Azuma ........................... 165/51 |
| 2011/0240394 | A1 * | 10/2011 | Hurd et al. ..................... 180/233 |
| 2012/0031693 | A1 * | 2/2012 | Deckard et al. .............. 180/68.3 |
| 2012/0161427 | A1 * | 6/2012 | Tsumiyama et al. .......... 280/781 |
| 2012/0193163 | A1 * | 8/2012 | Wimpfheimer et al. ...... 180/233 |
| 2012/0223500 | A1 * | 9/2012 | Kinsman et al. ........ 280/124.153 |
| 2012/0255799 | A1 * | 10/2012 | Kohler et al. ............ 180/65.245 |
| 2012/0299265 | A1 * | 11/2012 | King ...................... 280/124.136 |
| 2013/0319784 | A1 * | 12/2013 | Kennedy et al. ............... 180/292 |
| 2013/0319785 | A1 * | 12/2013 | Spindler et al. ............... 180/292 |
| 2014/0034409 | A1 * | 2/2014 | Nakamura et al. ............ 180/291 |

FOREIGN PATENT DOCUMENTS

| | | |
|---|---|---|
| WO | WO 2008/005131 | 1/2008 |
| WO | WO 2008/125496 | 10/2008 |
| WO | WO 2011/127138 | 4/2012 |

OTHER PUBLICATIONS

Bobcat, 2300 4X4 Utility Vehicle, www.utvguide.net/bobcat_2300_4x4.htm, Oct. 26, 2012, 3 pgs.
Bobcat, Toolcat™ Utility Work Machines brochure, Jan. 2009, 24 pgs.
Bobcat, Utility Vehicle Attachments brochure, Jan. 2008, 4 pgs.
Bobcat, Utility Vehicles brochure, Feb. 2009, 20 pgs.
International Preliminary Report of Patentability with Article 34 Amendment in PCT/US2011/031376, Oct. 2012, 21 pgs.
Written Opinion of the Searching Authority in PCT/US2011/031376, Oct. 2012, 7 pgs.
International Search Report in PCT/US2011/031376, Feb. 2012, 6 pgs.
Bobcat Service Manual for Utility Vehicle, Feb. 2007, 855 pgs.
U.S. Appl. No. 61/321,439, filed Apr. 6, 2010, (73 pages).
The Illustrated Encyclopedia of Military Vehicles, Iam V. Hogg and John Weeks, 1980 New Berlington Books, p. 63, 207; 6 pages.
Technical Report ARBRL-TR-02054, A Combinatorial Geometry Computer Description of the SR311 Vehicle, Jemes E. Shiells, Apr. 1978; 209 pages.
The XR311 Story, as posted on www.meisterburg.com (Archive version from Jun. 2, 2003 produced); 4 pages.
1971 XR311, Fourwheeler Magazine Feb. 1, 2013, Jim Allen, www.fourwheeler.com/features/129-1302-february-2013-backward-glances/ ; 5 pages.
The Humvee (FMC), www.angelfire.com/nb2/jeeppickups/humvee.html; Mar. 7, 2014; 9 pages.
XR311 Experimental Attack Vehicle, photographed by Mike Burton at www.svsm.org/gallery/sr311; Feb. 26, 2014; 16 pages.
FMC XR311, www.bellum.nu/armoury/FMCXR311.html (Archived version from Jun. 21, 2006 produced); 2 pages.
FMC XR311, www.wikipedia.org/wiki/FMC_XR311; Mar. 11, 2014; 3 pages.
James Glickenhaus brings the Hurst Baja Boot back to Monterey, Justin Hyde, http://jalopnik.com/5832752/james-glickenhaus-brings-the-hurst-baja-boot-to-monterey; Aug. 21, 2011; 4 pages.
James Glickenhaus buys Steve McQueen's Baja Boot, Ben Wojdyla, http://jalopnik.com/5620733/james-glickenhaus-buys-steve-mcqueens-baja-boot; Aug. 24, 2011; 2 pages.
Steve McQueen and the 450 hp Dune Buggy, www.silodrome.com; Mar. 12, 2014; 7 pages.
Conceptcarz.com 1967 Chevrolet Baja Boot images, www.conceptcarz.com; Mar. 7, 2014; 22 pages.
Class3racing.com Baja Boot images, Dec. 16, 2007; 7 pages.
Re: Front Suspension: Torsion Bar?, Dale Meisen, www.dune-buggy.com, Sep. 6, 2002, www.dune-buggy.com/buggytalk/buggytalkarchive.cgi?read=152999; 2 pages.
The Baja Boot 'off road' vehicle, Steve McQueen online, www.mcqueenonline.com; Mar. 12, 2014; 2 pages.
30 Years of Baja Racing, 4Wheel and Off Road Magazine, Peter MacGillivray, Mar. 1, 1998, www.fourwheeler.com; Mar. 12, 2014; 6 pages.

* cited by examiner

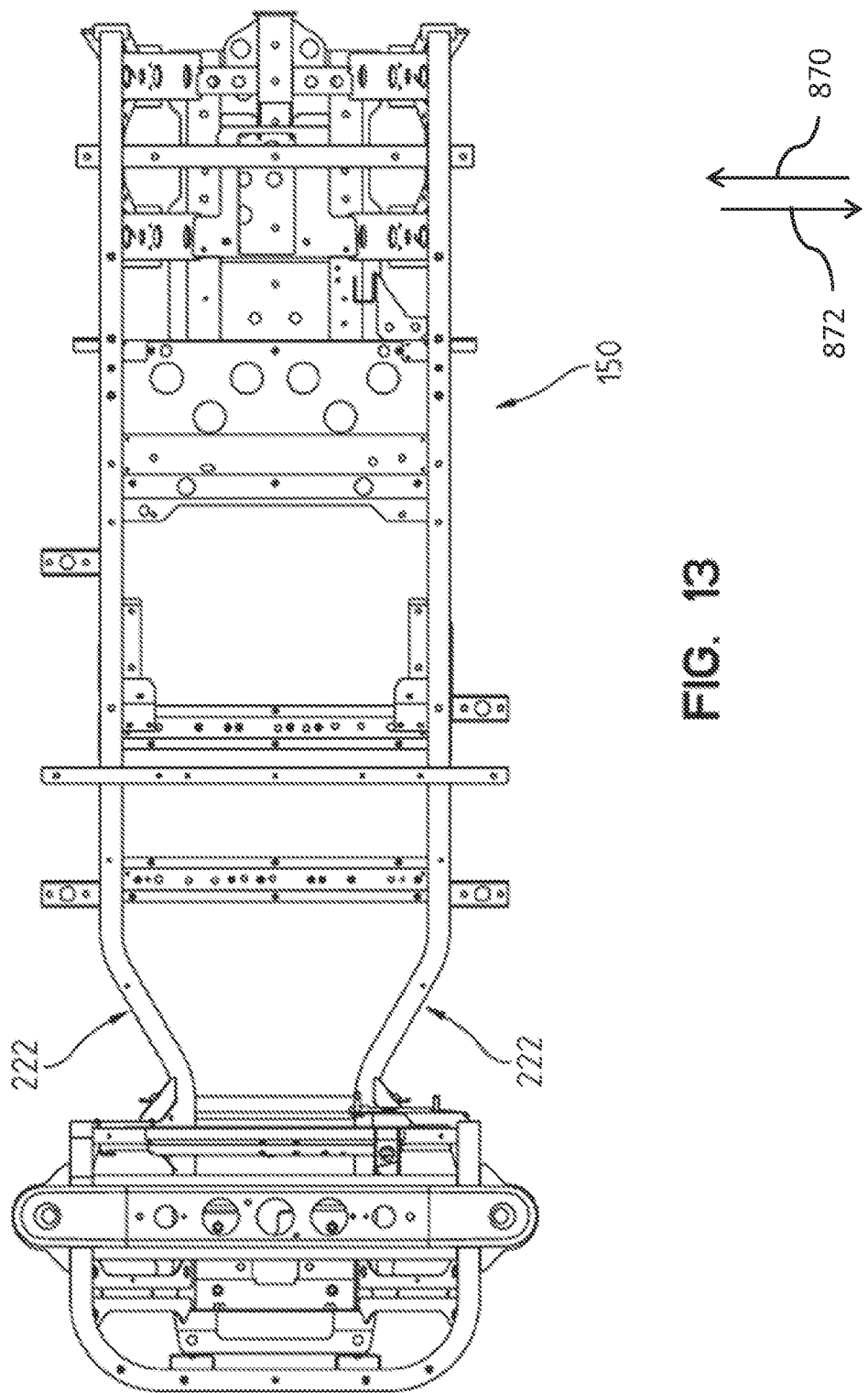

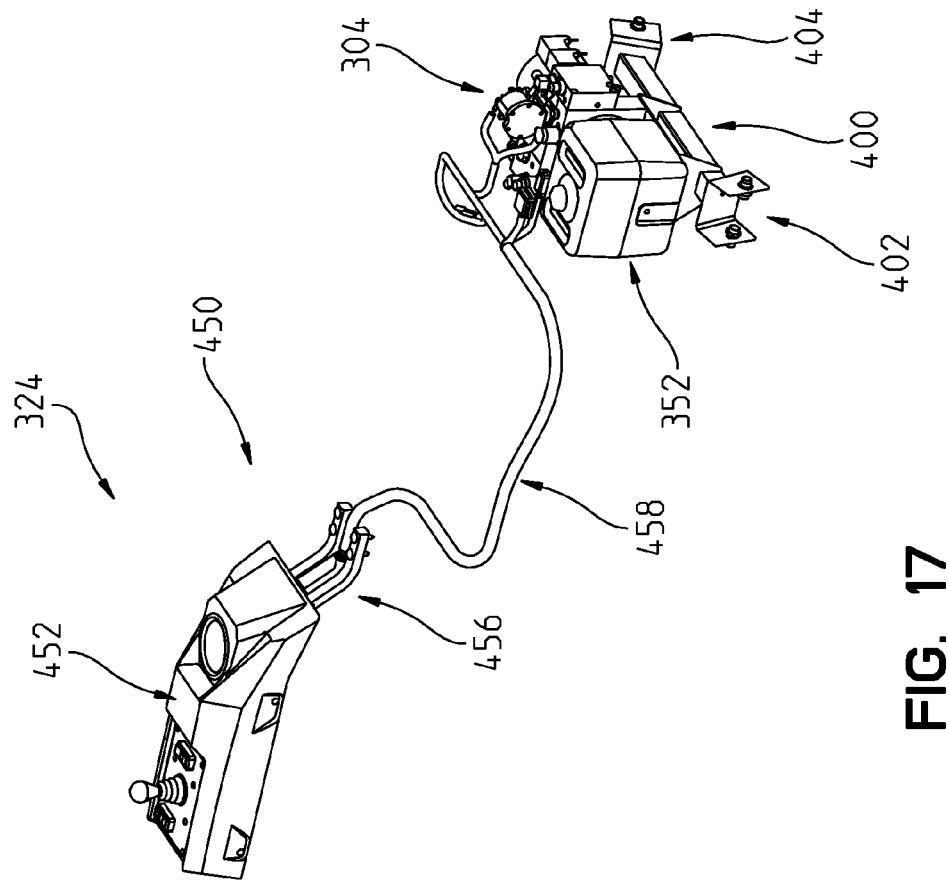
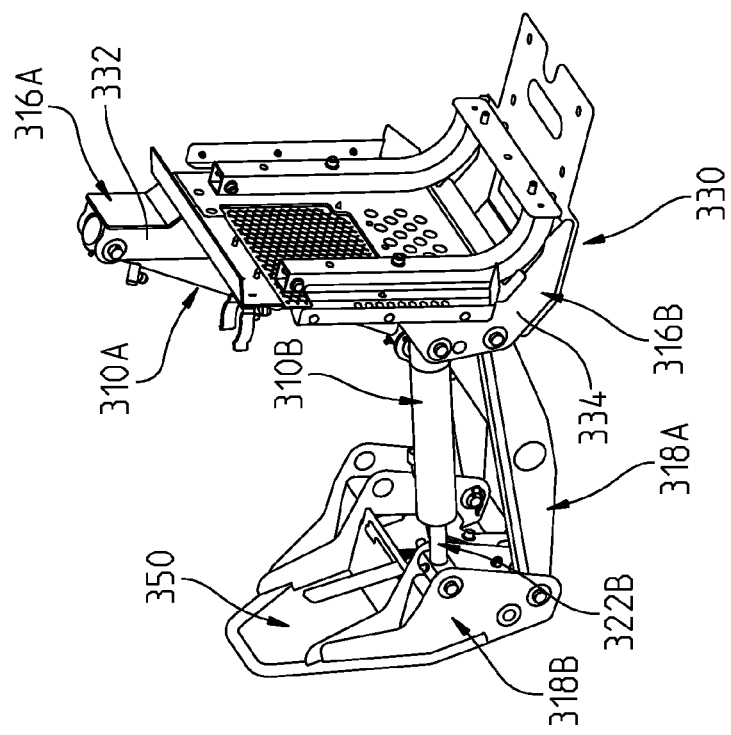
FIG. 17

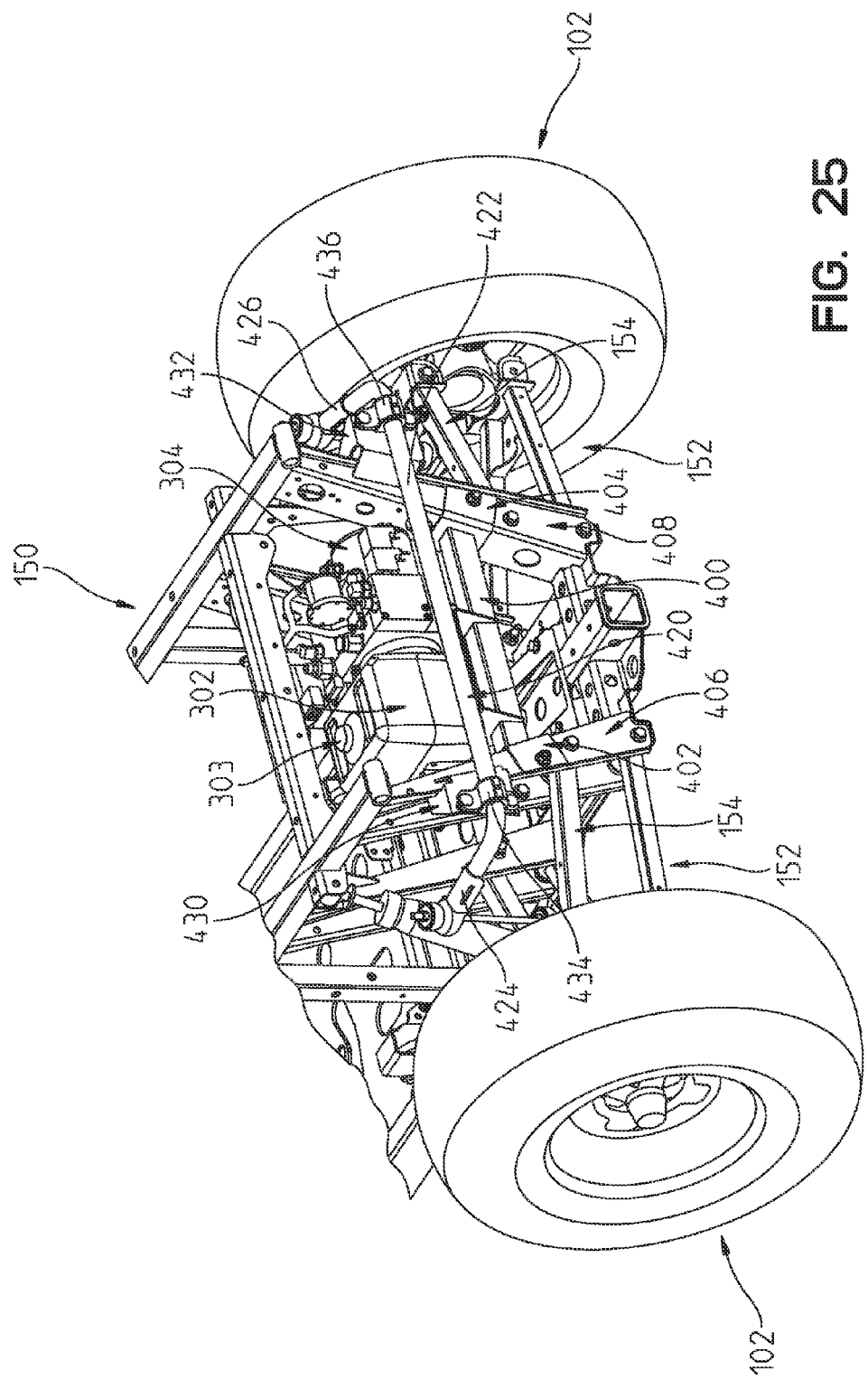

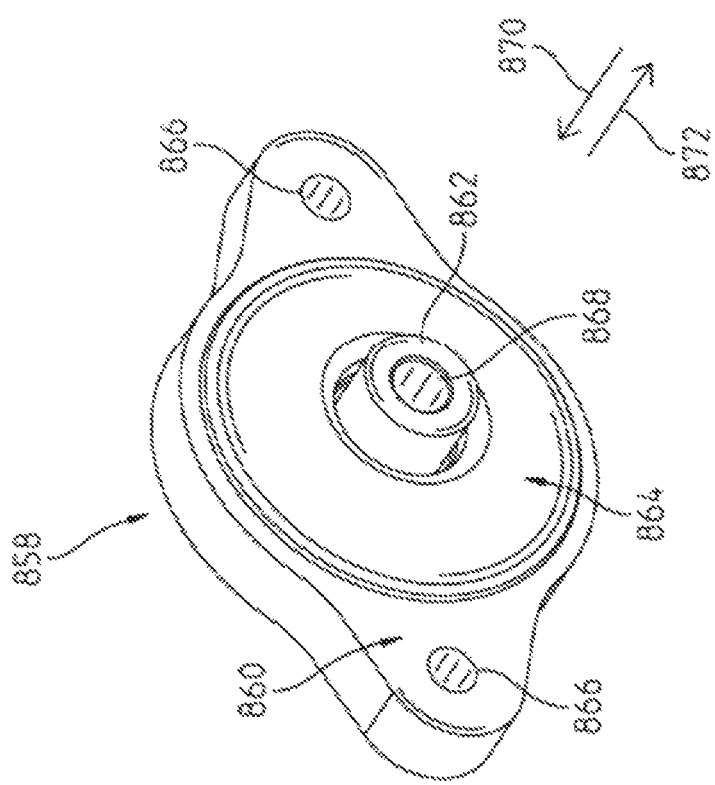

SIDE-BY-SIDE VEHICLE

RELATED APPLICATIONS

This application claims the benefit of U.S. Provisional Patent Application Ser. No. 61/321,455, filed Apr. 6, 2010, titled VEHICLE WITH HYDRAULIC UNIT, the disclosure of which is expressly incorporated by reference herein.

Reference is made to U.S. Provisional Patent Application Ser. No. 61/321,439, the disclosure of which is expressly incorporated herein by reference.

BACKGROUND AND SUMMARY

The present invention relates to vehicles having side-by-side seating and in particular to vehicles having side-by-side seating and a hydraulic system.

Utility vehicles which have side-by-side seating are known. BOBCAT brand utility vehicles include a hydraulic system having a RAPID LINK brand hydraulic attachment system which couples attachments to a front end of the utility vehicle.

In an exemplary embodiment of the present disclosure, a vehicle is provided. The vehicle may include a hydraulic system. The vehicle may include a sway bar positioned rearward of a hydraulic pump of the hydraulic system.

In another exemplary embodiment of the present disclosure, a vehicle is provided. The vehicle comprising a plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and a prime mover supported by the frame and operatively coupled to at least the first ground engaging member of the plurality of ground engaging members to propel the vehicle. The prime mover being positioned completely rearward of a front vertical plane of the side-by-side seating. The vehicle further comprising a CVT operatively coupled to the prime mover and the first ground engaging member, the CVT transferring power from the prime mover to the first ground engaging member; a first suspension coupling the first ground engaging member to the frame; a second suspension coupling the second ground engaging member to the frame; a first drive unit operatively coupled to the CVT and to the first ground engaging member, the first drive unit transferring power from the CVT to the first ground engaging member and being positioned rearward of the prime mover; and a sway bar coupled to the first suspension member and the second suspension member, the sway bar supported by the frame at a location rearward of the first drive unit.

In yet another exemplary embodiment of the present disclosure, a method of tying a first ground engaging member to a second ground engaging member is provided. The method comprising the steps of coupling the first ground engaging member to a frame through a first suspension; coupling the second ground engaging member to the frame through a second suspension; coupling the first ground engaging member to a prime mover through a first drive unit and a CVT; coupling the first suspension to the second suspension through a sway bar; and coupling the sway bar to the frame at a location rearward of the prime mover, the CVT, and the first drive unit.

In still another exemplary embodiment of the present disclosure, a vehicle is provided. The vehicle comprising: a plurality of ground engaging members; a frame supported by the plurality of ground engaging members; an operator area supported by the frame, the operator area including driver controls and seating adapted to support at least two people in a side-by-side relationship; a prime mover supported by the frame and operatively coupled to at least one of the plurality of ground engaging members to propel the vehicle; a CVT operatively coupled to the prime mover and the at least one of the plurality of ground engaging members, the CVT transferring power from the prime mover to the at least one ground engaging member; a first suspension coupling a first ground engaging member to the frame; a second suspension coupling a second ground engaging member to the frame; and a sway bar coupled to the first suspension member and the second suspension member, the sway bar supported by the frame and having a rear portion positioned rearward of a rear end of the frame at a first height.

In yet a further exemplary embodiment of the present disclosure, a vehicle is provided. The vehicle comprising a front axle including a plurality of front ground engaging members; a rear axle including a plurality of rear ground engaging members; a frame supported by the plurality of front ground engaging members and the plurality of rear ground engaging members; an operator area supported by the frame, the operator area including driver controls and seating adapted to support at least two people in a side-by-side relationship; a prime mover supported by the frame and operatively coupled to at least one of the front plurality of ground engaging members and at least one of the rear plurality of ground engaging members to propel the vehicle; a CVT operatively coupled to the prime mover and the at least one of the front plurality of ground engaging members and at least one of the rear plurality of ground engaging members, the CVT transferring power from the prime mover to the at least one of the front plurality of ground engaging members and at least one of the rear plurality of ground engaging members; and a hydraulic system coupled to the frame, the hydraulic system including a hydraulic reservoir, a hydraulic pump operatively coupled to the hydraulic reservoir, and at least one hydraulic cylinder operatively coupled to the hydraulic pump, the at least one hydraulic cylinder being positioned forward of front axle and the hydraulic reservoir and hydraulic pump both being positioned completely rearward of the rear axle.

In still a further exemplary embodiment of the present disclosure, a vehicle is provided. The vehicle comprising a plurality of ground engaging members; a frame supported by the plurality of ground engaging members; a dash supported by the frame; side-by-side seating supported by the frame rearward of the dash and spaced apart from the dash, the side-by-side seating including a seat bottom portion and a seat back portion; a hydraulic system supported by the frame, the hydraulic system including a hydraulic reservoir and a hydraulic pump; a console supported by the frame and including at least a first hydraulic system input operatively coupled to the hydraulic pump, the console being positioned over the seat bottom portion and spaced above a top horizontal plane of the seat bottom portion; a prime mover supported by the frame and operatively coupled to at least one of the plurality of ground engaging members to propel the vehicle; and a CVT operatively coupled to the prime mover and the at least one of the plurality of ground engaging members, the CVT transferring power from the prime mover to the at least one ground engaging member.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 13 illustrates a top view of the frame of the chassis of FIG. 8;

FIG. 17 illustrates a rear perspective view of the portion of the exempla hydraulic system of FIG. 16;

FIG. 25 illustrates a rear portion of the vehicle of FIG. 1;

FIG. 32 illustrates a portion of one of the mounts of FIG. 29;

Corresponding reference characters indicate corresponding parts throughout the several views. Unless stated otherwise the drawings are proportional.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts. Further, although described in the context of a diesel powered vehicle, the embodiments disclosed herein may be implemented as part of a hybrid vehicle, a gasoline powered vehicle, any other suitable type of internal combustion powered vehicle, or an electric vehicle.

Figure 1:
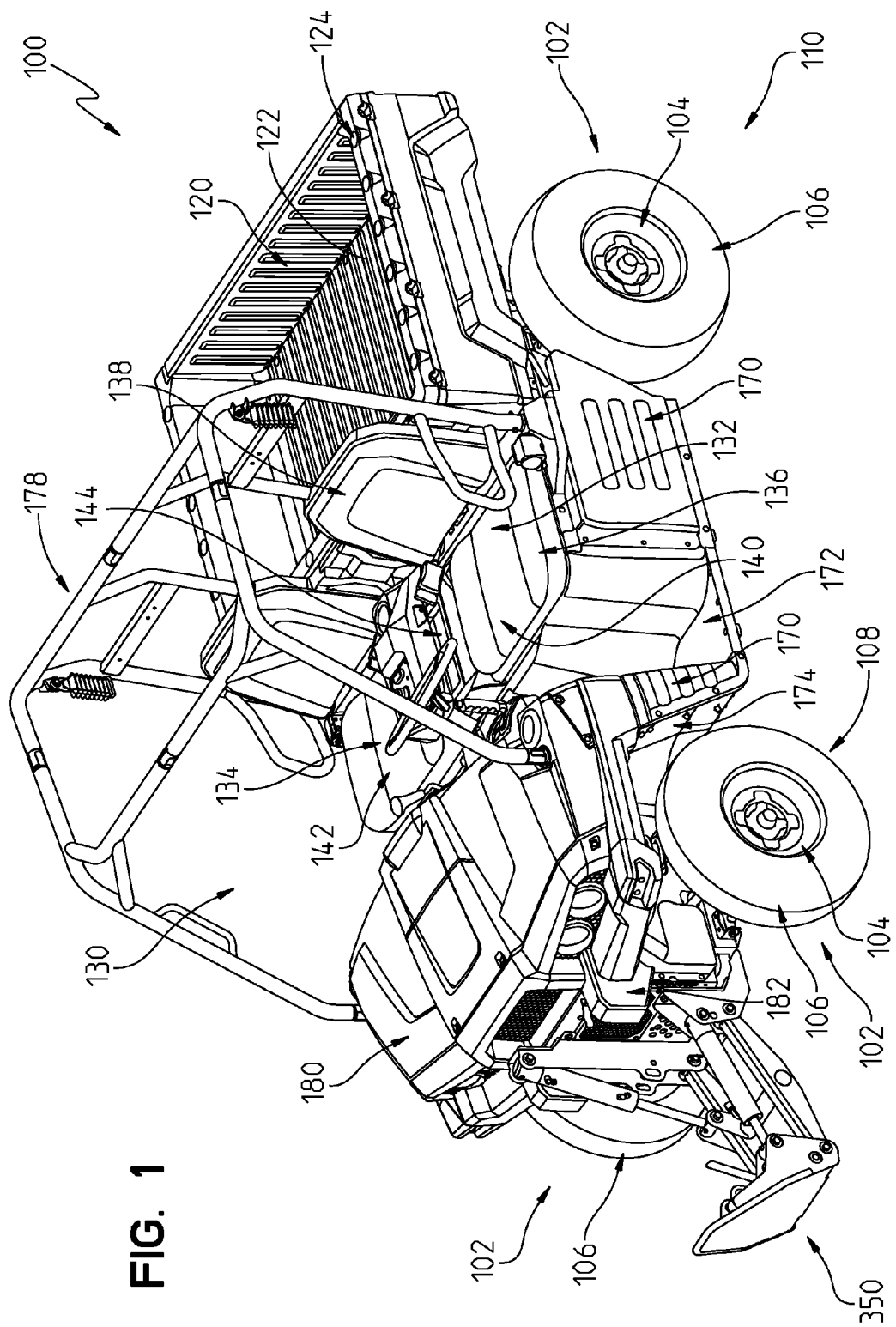
FIG. 1 illustrates a perspective view of an exemplary utility vehicle.

Referring to FIG. 1, an illustrative embodiment of a vehicle 100 is shown. Vehicle 100, as illustrated, includes a plurality of ground engaging members 102. Illustratively, ground engaging members 102 are wheels 104 and associated tires 106. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

In addition to vehicle 100, the teachings of the present disclosure may be used in combination with the suspension systems, drive configurations, modular sub-sections, power steering units, and other features described in any one of U.S. Provisional Patent Application Ser. No. 60/918,502, titled VEHICLE, filed Mar. 16, 2007; U.S. Provisional Patent Application Ser. No. 60/918,556, titled VEHICLE, filed Mar. 16, 2007; U.S. Provisional Patent Application Ser. No. 60/918,444, titled VEHICLE WITH SPACE UTILIZATION, filed Mar. 16, 2007; U.S. Provisional Patent Application Ser. No. 60/918,356, titled UTILITY VEHICLE HAVING MODULAR COMPONENTS, filed Mar. 16, 2007; U.S. Provisional Patent Application Ser. No. 60/918,500, titled METHOD AND APPARATUS RELATED TO TRANSPORTABILITY OF A VEHICLE, filed Mar. 16, 2007; U.S. patent application Ser. No. 12/050,048, titled VEHICLE WITH SPACE UTILIZATION, filed Mar. 17, 2008; U.S. patent application Ser. No. 12/050,064, titled VEHICLE WITH SPACE UTILIZATION, filed Mar. 17, 2008; U.S. patent application Ser. No. 12/050,041, titled METHOD AND APPARATUS RELATED TO TRANSPORTABILITY OF A VEHICLE, filed Mar. 17, 2008; U.S. patent application Ser. No. 12/092,151, titled UTILITY VEHICLE HAVING MODULAR COMPONENTS, filed Apr. 30, 2008; U.S. patent application Ser. No. 12/092,153, titled VEHICLE, filed Apr. 30, 2008, U.S. patent application Ser. No. 12/092, 191, titled VEHICLE, filed Apr. 30, 2008, U.S. patent application Ser. No. 12/135,107, titled VEHICLE, filed Jun. 6, 2008, U.S. patent application Ser. No. 12/134,909, titled SUSPENSION SYSTEMS FOR A VEHICLE, filed Jun. 6, 2008, U.S. patent application Ser. No. 12/218,572, titled FLOORBOARD FOR A VEHICLE, filed Jul. 16, 2008, U.S. patent application Ser. No. 12/317,298, titled VEHICLE, filed Dec. 22, 2008, U.S. patent application Ser. No. 12/484,921, titled ELECTRIC VEHICLE, filed Jun. 15, 2009, and U.S. Provisional Patent Application Ser. No. 61/187,147, titled ELECTRIC VEHICLE, filed Jun. 15, 2009, the disclosures of which are expressly incorporated by reference herein.

Referring to the illustrated embodiment in FIG. 1, a first set of wheels, one on each side of vehicle 100, generally correspond to a front axle 108. A second set of wheels, one on each side of vehicle 100, generally correspond to a rear axle 110. Although each of front axle 108 and rear axle 110 are shown having a single ground engaging members 102 on each side, multiple ground engaging members 102 may be included on each side of the respective front axle 108 and rear axle 110. As configured in FIG. 1, vehicle 100 is a four wheel, two axle vehicle. As mentioned herein one or more of ground engaging members 102 are operatively coupled to a drivetrain 112 (see FIG. 20) to power the movement of vehicle 100, as further described in U.S. Provisional Patent Application Ser. No. 61/321,439, titled VEHICLE, filed concurrently herewith, the disclosure of which is expressly incorporated by reference herein.

Figure 27:
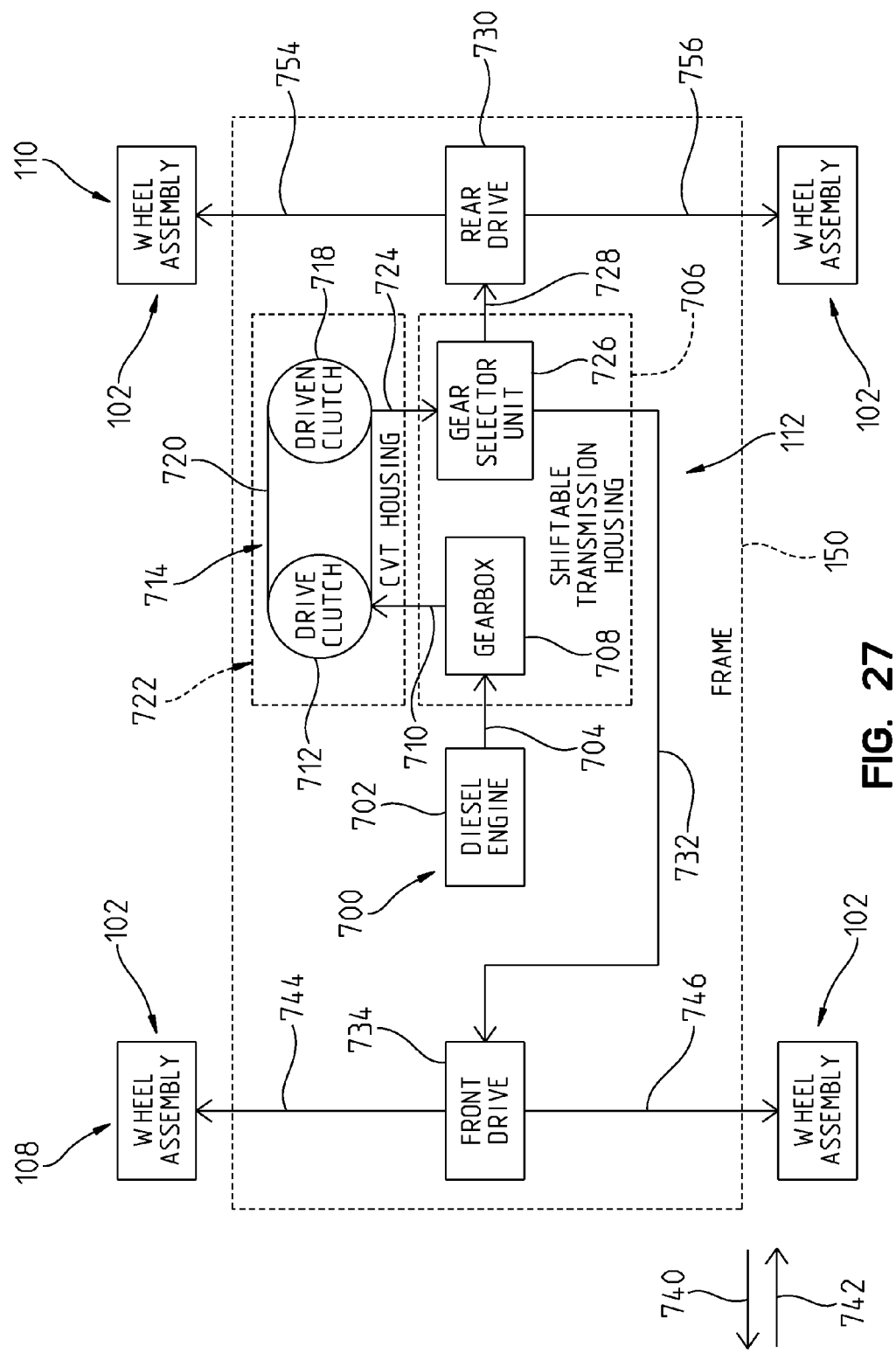
FIG. 27 illustrates a representative view of an drivetrain system.

Referring to FIG. 27, an exemplary drivetrain system 112 is represented. A prime mover 700 is shown. In the illustrated embodiment, prime mover 700 is a diesel engine 702. Other exemplary prime movers include gasoline engines, other suitable internal combustion engines, an electric motor, a hybrid system including both an internal combustion engine and an electric motor, a fuel cell, and any other suitable device for providing a source of power. In one embodiment, diesel engine 702 is a liquid cooled engine.

An output shaft 704 of diesel engine 702 is operatively coupled to a gearbox 708. In the illustrated embodiment, the gearbox 708 is positioned within a housing 706 of a shiftable transmission. Gearbox 708 has an output shaft 710 which is operatively coupled to a drive clutch 712 of a continuously variable transmission ("CVT") 714. In one embodiment, gearbox 708 is configured so that output shaft 710 rotates at a higher number of revolutions per minute ("rpm") than output shaft 704.

Drive clutch 712 is coupled to a driven clutch 718 through a belt 720. The drive clutch 712, driven clutch 718, and belt 720 are housed in a CVT housing 722. In one embodiment, drive clutch 712 and driven clutch 718 correspond to the drive clutch and driven clutch disclosed in U.S. patent application Ser. No. 12/069,521, the disclosure of which is expressly incorporated by reference herein. One or both of drive clutch 712 and driven clutch 718 includes impellers which direct airflow within CVT housing 722 to cool at least belt 720. Additional details of continuously variable transmissions are provided in U.S. Pat. No. 6,149,540 and U.S. Pat. No. 7,163,477, the disclosures of which are expressly incorporated by reference herein. In one embodiment, CVT housing 722 is a sealed housing.

Driven clutch 718 is operatively coupled to an output shaft 724 which is coupled to a gear selector unit 726. Gear selector unit 726 includes gearing which is coupled to a first output shaft 728 which is operatively coupled to a rear drive unit 730 and a second output shaft 732 which is operatively coupled to a front drive unit 734. The gearing of gear selector unit 726 permits the selection of at least one forward gear which causes vehicle 100 to be propelled in direction 740 and at least one reverse gear which causes vehicle 100 to be propelled in direction 742. In one embodiment, at least two forward gears are provided (low and high), a first reverse gear, and a neutral position. Although, gear selector unit 726 is represented as having both first output shaft 728 and second output shaft 732, in one embodiment, gear selector unit 726 only includes one of first output shaft 728 and second output shaft 732 and the corresponding rear drive unit 730 and front drive unit 734 is removed.

Front drive unit 734 has two output shafts 744 and 746, each of which couples front drive unit 734 to one of ground engaging member 102 of front axle 108. Front drive unit 734, in the illustrated embodiment, is laterally in line with the ground engaging members 102 of front axle 108. Output shafts 744 and 746 generally power the respective ground engaging member 102 with the power generated by diesel engine 702. In one embodiment, front drive unit 734 is a lockable differential which may be locked to provide power to both of output shafts 744 and 746 or unlocked to provide power to only one of output shafts 744 and 746 or neither of output shafts 744 and 746. Exemplary front drive configurations are disclosed in U.S. Provisional Patent Application Ser. No. 61/187,147, the disclosure of which is expressly incorporated by reference herein.

In one embodiment, front drive unit 734 is an automatic locking front differential manufactured by Hilliard Corporation of Elmira, N.Y., and has an overrunning clutch. Exemplary overrunning clutches are disclosed in U.S. Pat. RE38,012E, the subject matter of which is incorporated herein by reference. In one embodiment, front drive unit 734 operates under the principle described in U.S. Pat. No. 5,036,939, the subject matter of which is incorporated herein by reference. In one embodiment, front drive unit 734 is designed to engage when the wheel slippage is in the range of 10-30%. In one embodiment, front drive unit 734 is a Model No. 1332670 available from Polaris Industries Inc. of Medina Minn. In one embodiment, front drive unit 734 which includes active descent control and is available from Polaris Industries Inc. of Medina Minn.

Rear drive unit 730 has two output shafts 754 and 756, each of which couples rear drive unit 730 to one of ground engaging member 102 of rear axle 110. Rear drive unit 730, in the illustrated embodiment, is laterally in line with the ground engaging members 102 of rear axle 110. Output shafts 754 and 756 generally power the respective ground engaging member 102 with the power generated by diesel engine 702. In one embodiment, rear drive unit 730 is a lockable differential which may be locked to provide power to both of output shafts 754 and 756 or unlocked to provide power to only one of output shafts 754 and 756 or neither of output shafts 754 and 756.

Figure 20:
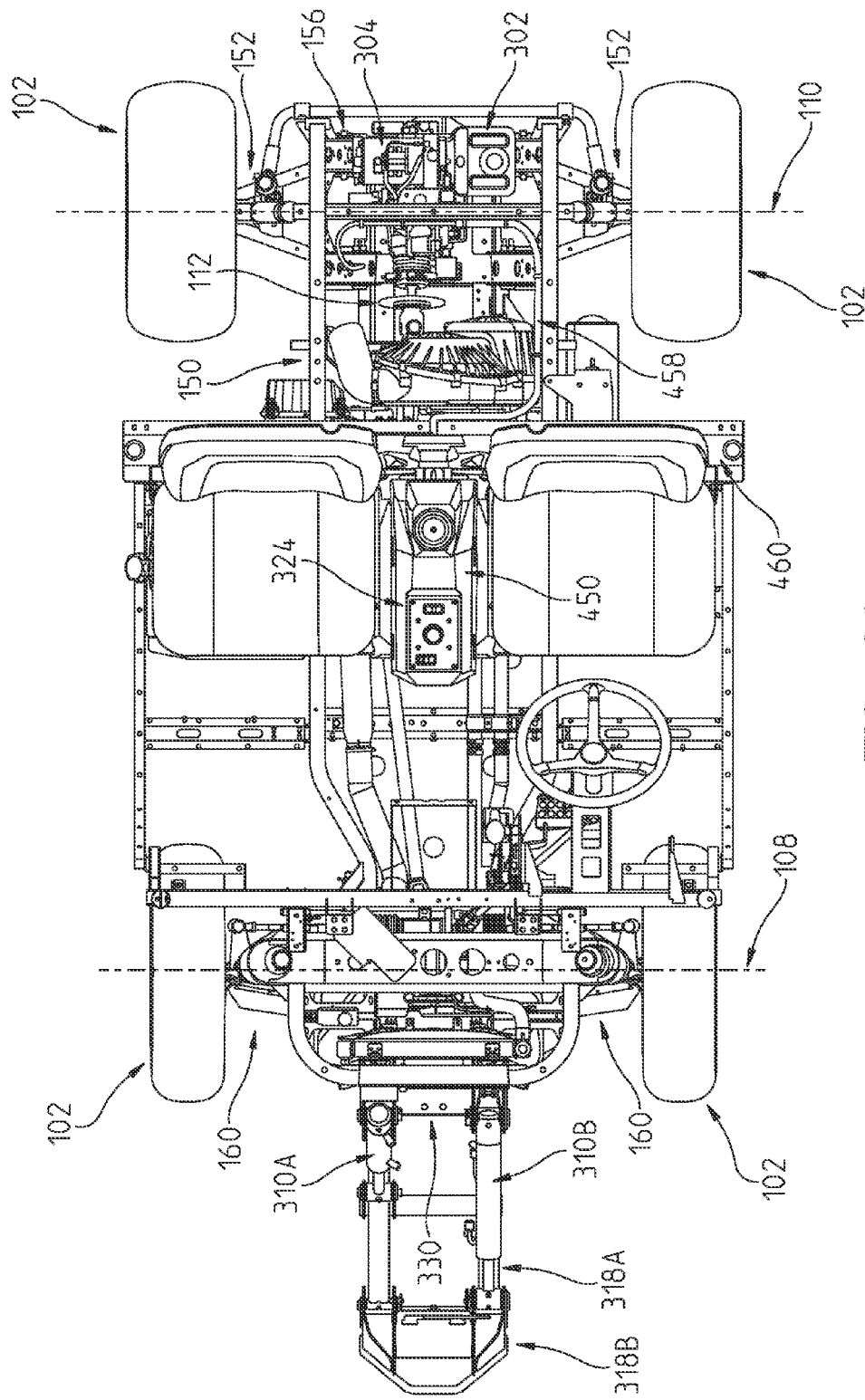
FIG. 20 illustrates a top view of the exemplary vehicle of FIG. 1 with the body panels, cargo bed, and roll cage removed.
Figure 28:
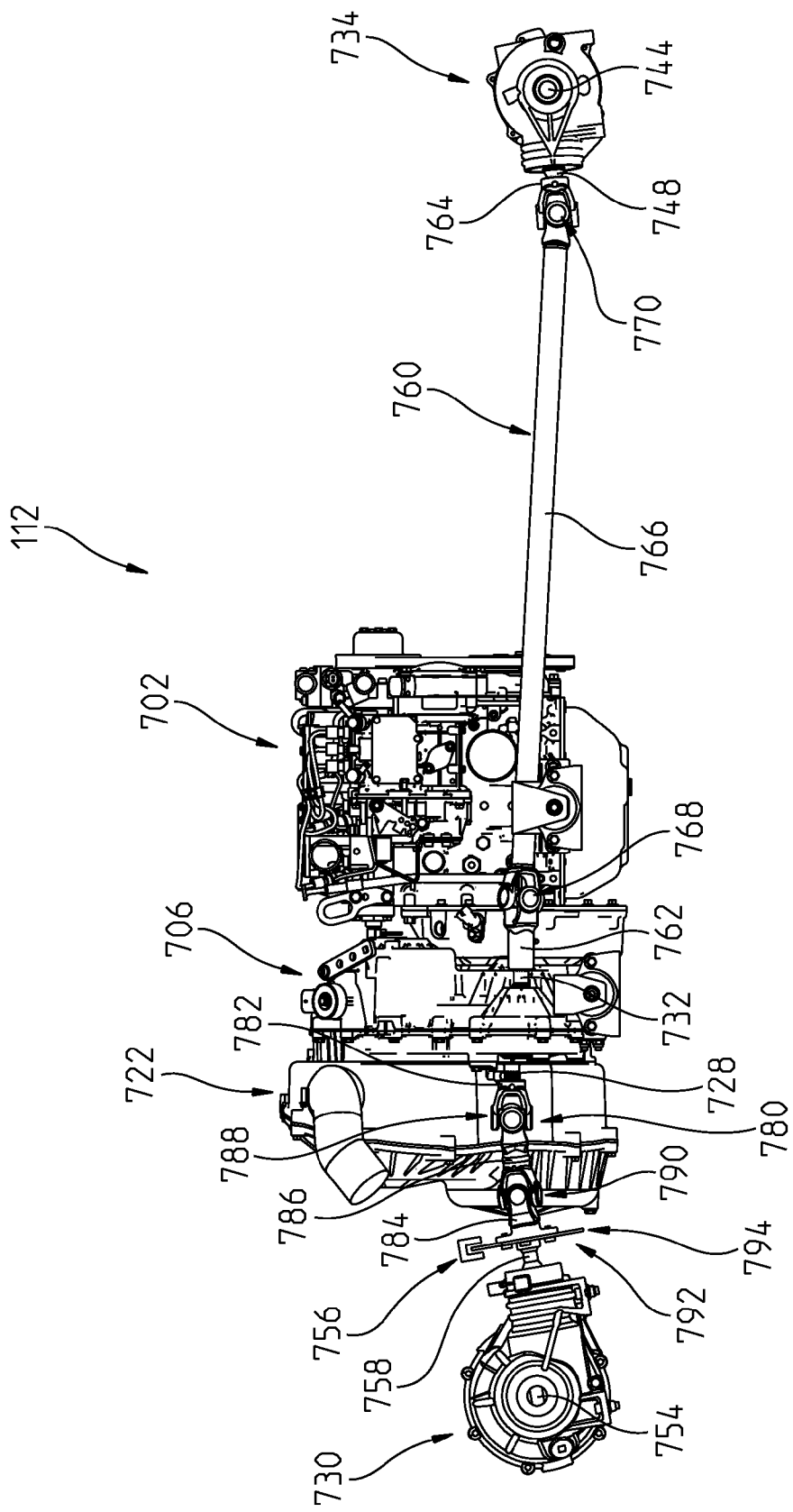
FIG. 28 illustrates an exemplary drivetrain system.

Referring to FIG. 28, an exemplary representation of drivetrain 112 is shown. In FIG. 28, diesel engine 702, shiftable transmission housing 706, CVT housing 722, rear drive unit 730, and front drive unit 734 are shown in the positions they occupy when supported by frame 150. Second output shaft 732 of gear selector unit 726 is coupled to an input shaft 748 of front drive unit 734 through a prop shaft 760. Prop shaft 760 includes a first portion 762 coupled to second output shaft 732, a second portion 764 coupled to input shaft 748, and a third portion 766 coupled to first portion 762 and second portion 764 through universal joint 768 and universal joint 770, respectively. As shown in FIG. 28, prop shaft 760 generally tilts downward as it runs from second output shaft 732 towards front drive unit 734. In a similar fashion, first output shaft 728 of gear selector unit 726 is coupled to an input shaft 758 of rear drive unit 730 through a prop shaft 780. Prop shaft 780 includes a first portion 782 coupled to first output shaft 728, a second portion 784 coupled to input shaft 758, and a third portion 786 coupled to first portion 782 and second portion 784 through universal joint 788 and universal joint 790, respectively. As shown in FIG. 20, prop shaft portion 784 generally tilts downward as it runs from first output shaft 728 towards rear drive unit 730. In one embodiment, rear drive unit 730 is angled upwards by about 10 degrees.

Prop shaft 780 further carries a parking brake 792. A disc 794 of parking brake 792 is coupled to second portion 784 of prop shaft 780. A caliper 796 is supported by frame 150 and actuatable by an operator input in the operator area of vehicle 100.

Figure 29:
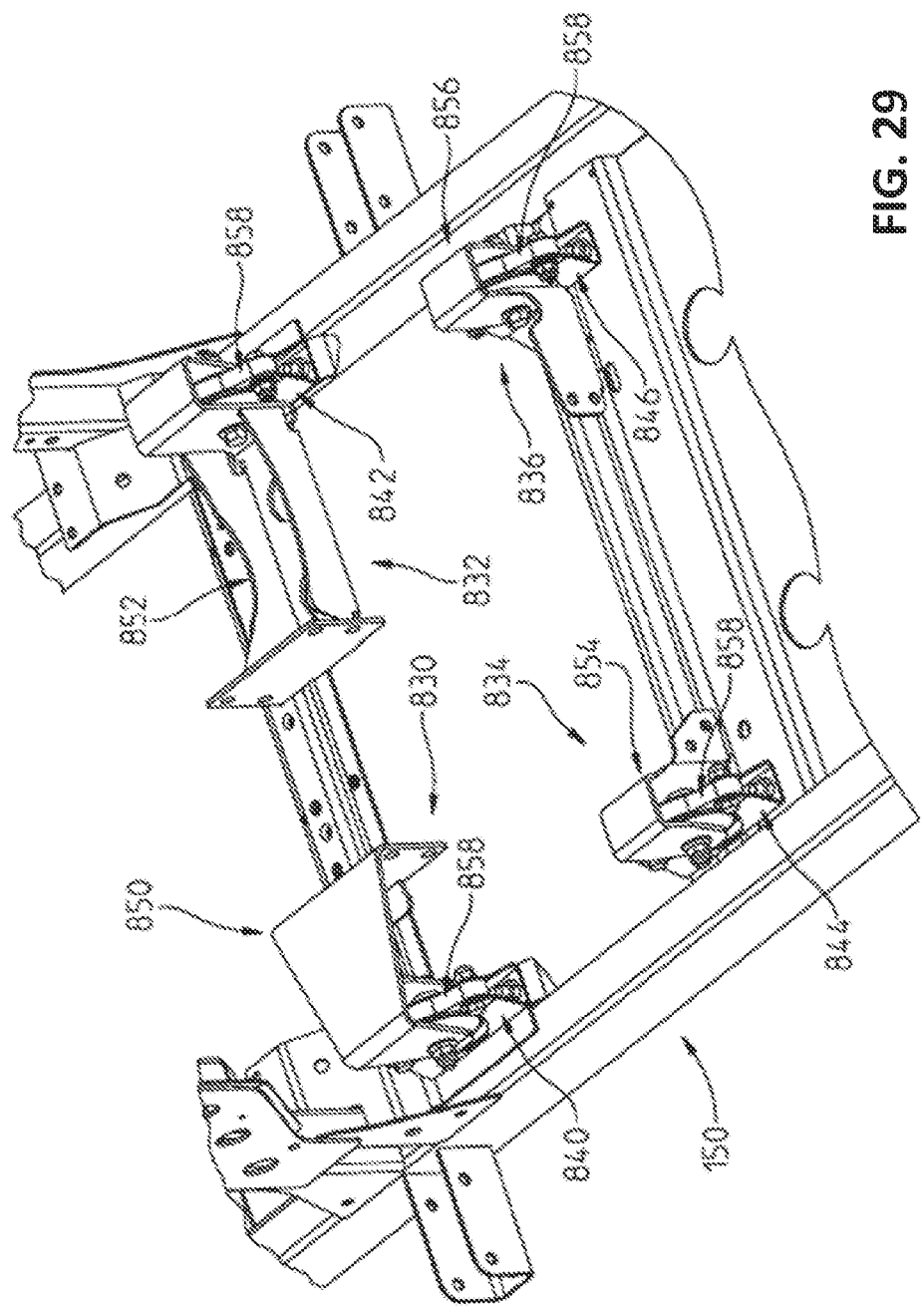
FIG. 29 illustrates a plurality of mounts for the engine and transmission of the drivetrain of FIG. 27.
Figure 30:
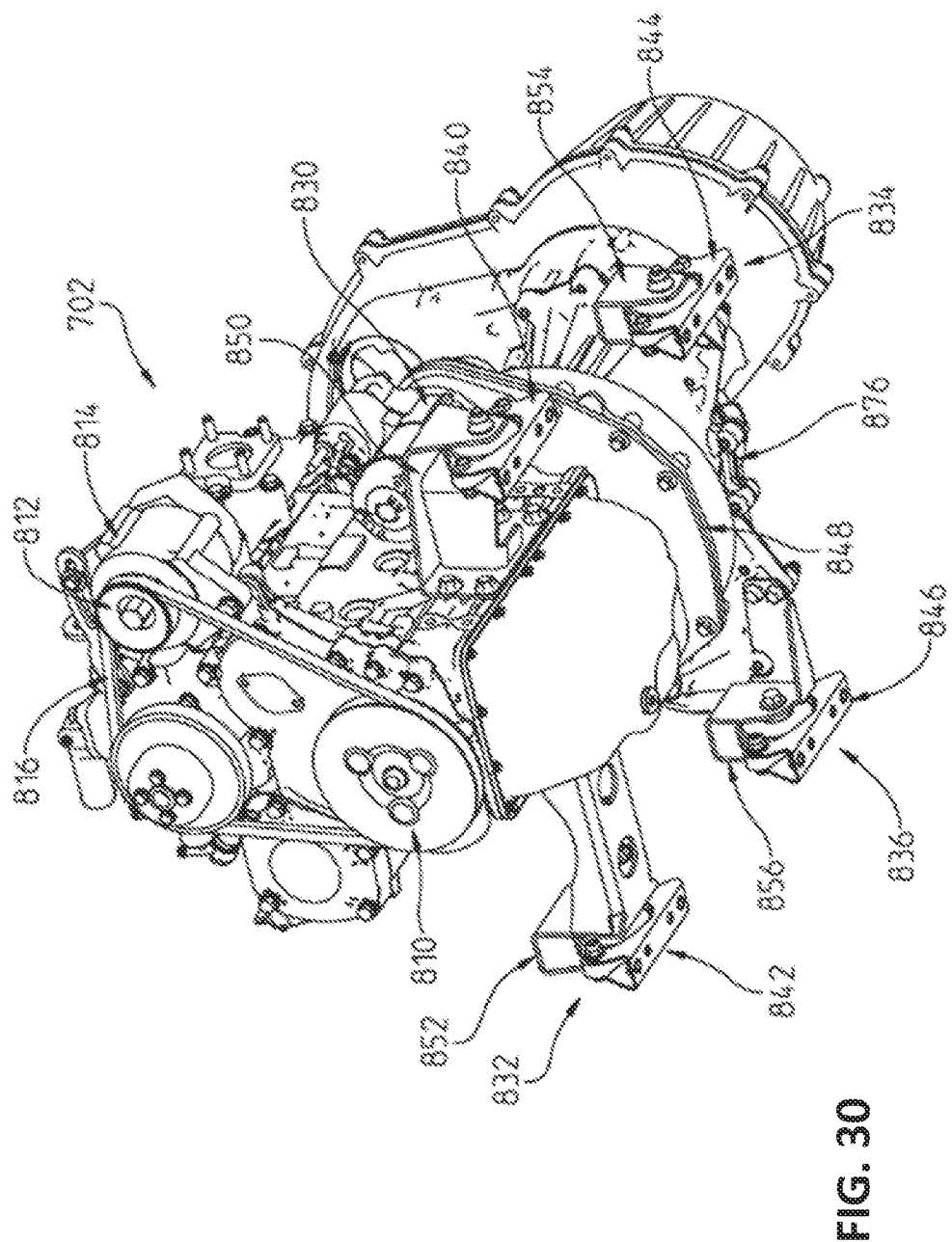
FIG. 30 illustrates a first lower perspective view of the engine and transmission of the drivetrain of FIG. 27 including the mounts of FIG. 29.
Figure 31:
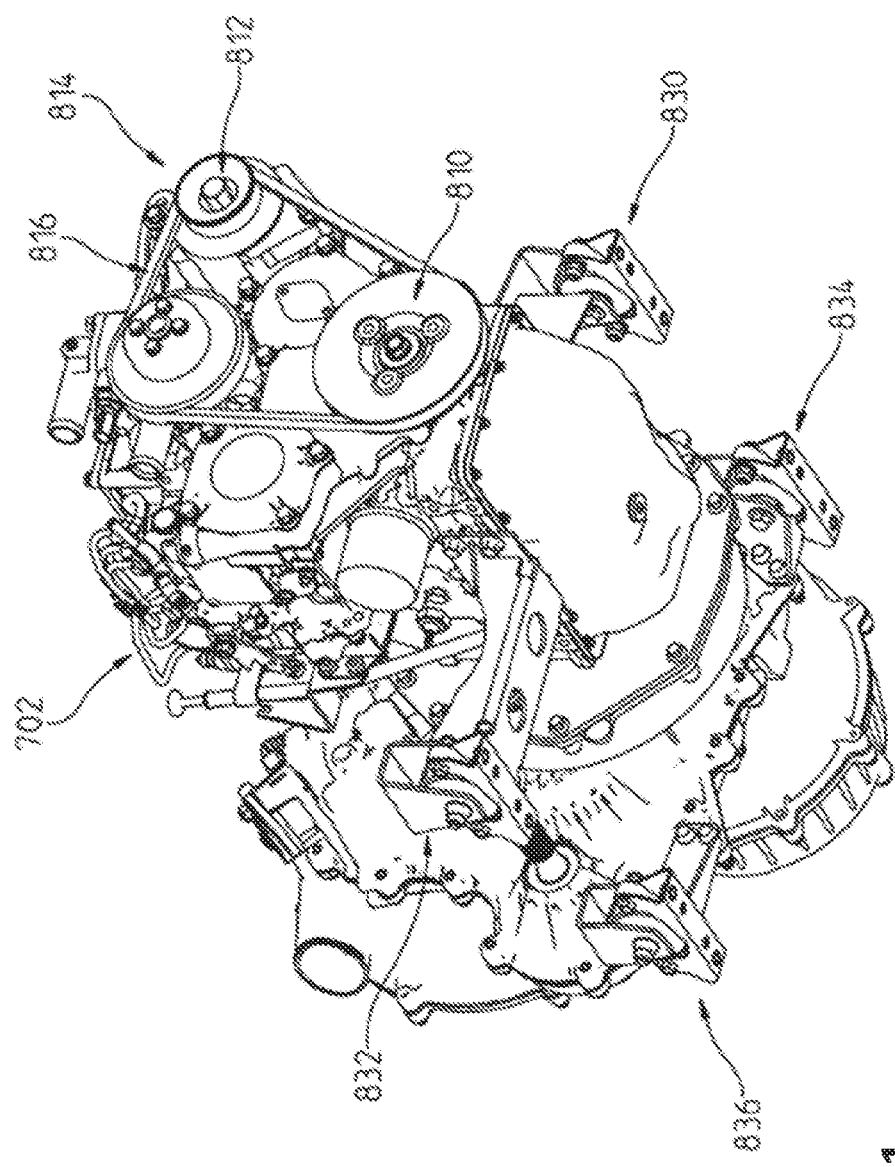
FIG. 31 illustrates a second lower perspective view of the engine and transmission of the drivetrain of FIG. 27 including the mounts of FIG. 29.

Referring to FIGS. 30 and 31, diesel engine 702, shiftable transmission housing 706, and CVT housing 722 are supported by four engine mounts: front mount 830, front mount 832, rear mount 834, and rear mount 836. Each of front mount 830, front mount 832, rear mount 834, and rear mount 836 have a corresponding lower portion (lower portion 840, lower portion 842, lower portion 844, and lower portion 846) coupled to frame 150 and a corresponding upper portion (upper portion 850, upper portion 852, upper portion 854, and upper portion 856) (See FIG. 29). Upper portion 850 and upper portion 852 are coupled directly to diesel engine 702. Upper portion 854 and upper portion 856 are coupled directly to shiftable transmission housing 706. Diesel engine 702 and shiftable transmission housing 706 are in turn coupled together at location 848 (see FIG. 17).

Each of lower portion 840, lower portion 842, lower portion 844, and lower portion 846 are coupled to the corresponding one of upper portion 850, upper portion 852, upper portion 854, and upper portion 856 through a coupling member 858. Referring to FIG. 32, coupling member 858 includes a first base portion 860, a second base portion 862, and a connecting portion 864. First base portion 860 is coupled to the respective lower portion 840-846 with fasteners that are received through apertures 866. Second base portion 862 is coupled to the respective upper portion 850-856 with a fastener that is received through opening 868. Connecting portion 864 couples first base portion 860 to second base portion 862. Connecting portion 864 is an elastomer or other type of material which permits second base portion 862 to move relative to first base portion 860 generally along its axis in direction 870 and direction 872, but to generally maintain the position of second base portion 862 relative to first base portion 860 in radial directions. In one embodiment, the durometer of connecting portion 864 is about 70. In one embodiment, the durometer of connecting portion 864 is selected such that the assembly of diesel engine 702, shiftable transmission housing 706, and CVT housing 722 may move about 0.5 inches side-to-side in direction 870 or direction 872 (see FIG. 13).

Referring to FIG. 28, mounts 830 and 832 are positioned lower than mounts 834 and 836. In one embodiment, mounts 830-836 are all positioned in the same plane. In one embodiment, mounts 830 and 832 are positioned in a first plane and mounts 834 and 836 are positioned in a second plane offset from the first plane. In one embodiment, the second plane is lower than the first plane. In one embodiment, the second plane is higher than the first plane.

In one embodiment, instead of four mounts 830-836, only three mounts are provided to support the assembly of diesel engine 702, shiftable transmission housing 706, and CVT housing 722. In one embodiment, front mount 830 and front mount 832 are provided as shown in FIG. 17 and a single mount coupled to shiftable transmission housing 706 replaces rear mount 834 and rear mount 836 at a location 876.

Returning to FIG. 1, vehicle 100 includes a bed 120 having a cargo carrying surface 122. Cargo carrying surface 122 may be flat, contoured, and/or comprised of several sections. Bed 120 further includes a plurality of mounts 124 (one indicated) for receiving an expansion retainer (not shown) which may couple various accessories to bed 120. Additional details of such mounts and expansion retainers are provided in U.S. Pat. No. 7,055,454, to Whiting et al., filed Jul. 13, 2004, titled "Vehicle Expansion Retainers," the disclosure of which is expressly incorporated by reference herein.

Vehicle 100 includes an operator area 130 including seating 132 for one or more passengers. Operator area 130 further includes a plurality of operator controls 134 by which an operator may provide input into the control of vehicle 100. Controls 134 may include controls for steering, shifting gears, acceleration, and braking. Seating 132 includes a seat bottom portion 136 and a seat back portion 138 and head rests (not shown). Seating 132 is shown as bucket seats 140 and 142 with a console portion 144 therebetween. As shown herein, the operator area 130 only includes seating for individuals in a first row. In one embodiment, operator area is configured such that seating 132 includes multiple rows of seating.

Vehicle 100 includes four wheel independent suspensions. Referring to FIG. 20, each of ground engaging members 102 of rear axle 110 is coupled to a frame 150 (FIG. 8A) through a rear suspension 152. Each of ground engaging members 102 of front axle 108 is coupled to frame 150 through a front suspension 160.

Figure 8:
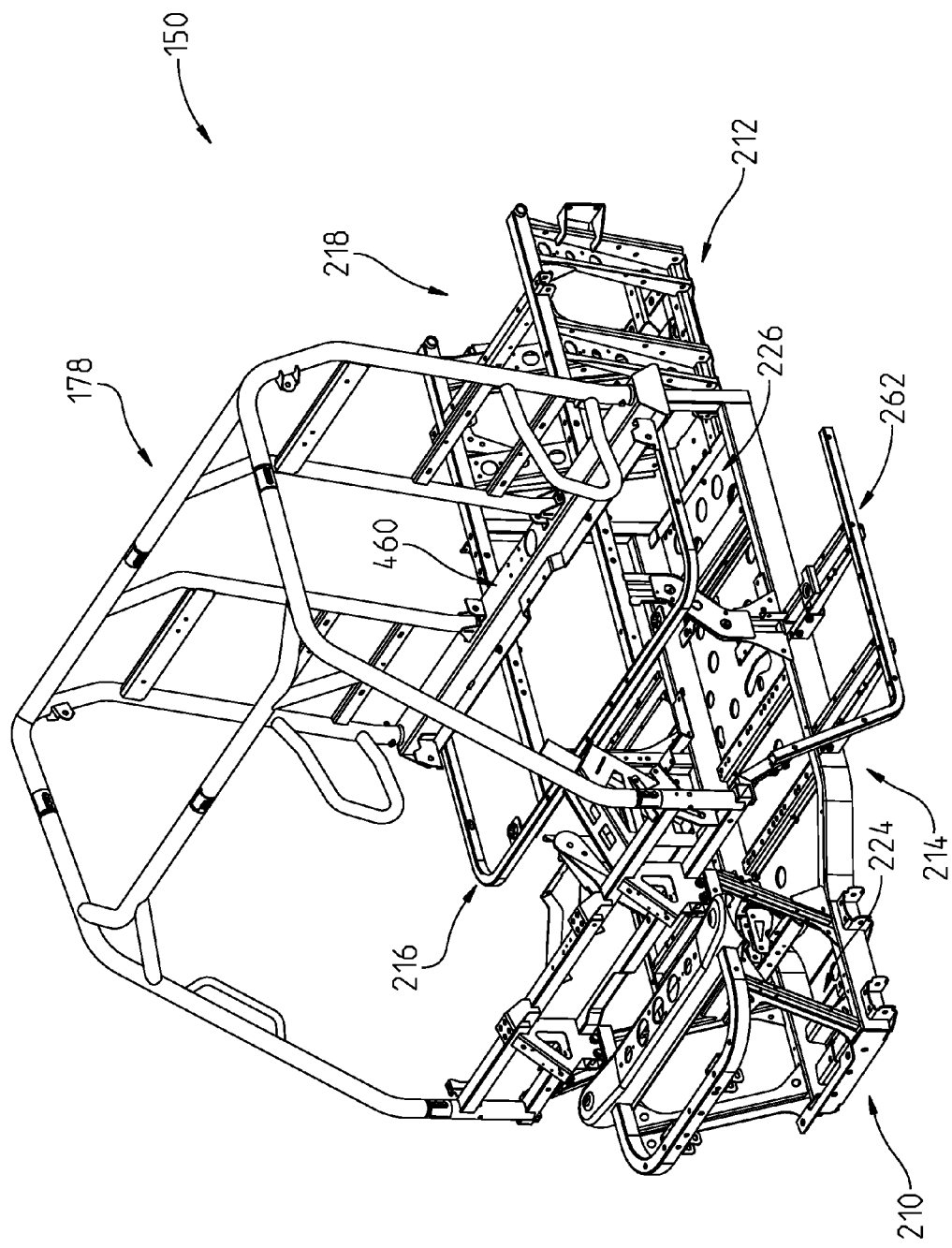
FIG. 8 illustrates a perspective view of a chassis of the exemplary utility vehicle.

In addition to the bed 120, utility vehicle includes a plurality of body components, and as best shown in FIGS. 1-6, namely side panels 170, floor boards 172, wheel wells 174, dash 176, rollover structure 178, hood 180, and bumper 182. All of these items are directly or indirectly attached to and/or supported by the vehicle frame 150 (see FIG. 8).

With reference to FIGS. 8-14, frame 150 supports rollover structure 178. Frame 150 includes a front frame portion 210, a rear frame portion 212 and an intermediate frame portion 214. The frame portions 210, 212, 214 provide support to drivetrain 112. The wheels 104 of front axle 108 are coupled to front frame portion 210 of frame 150 and support front frame portion 210 of frame 150 above the ground. Intermediate frame portion 214 includes a seat support portion 216. The wheels 104 of rear axle 110 are coupled to rear frame portion 212 of frame 150 and support rear frame portion 212 of frame 150 above the ground. Rear frame portion 212 of frame 150 further includes a bed support portion 218.

Figure 8A:
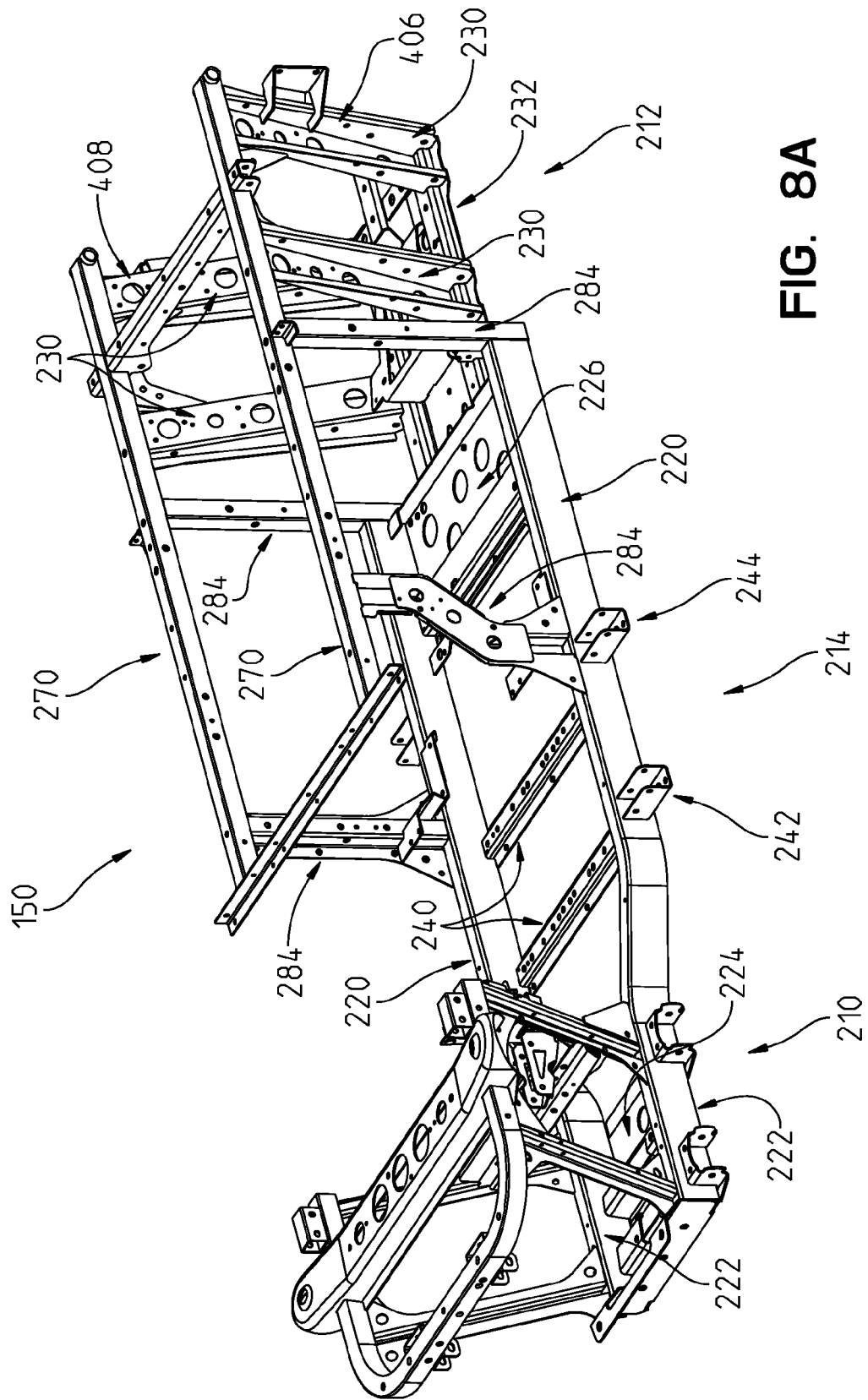
FIG. 8A illustrates an upper, perspective view of a frame of the chassis of FIG. 8.
Figure 8B:
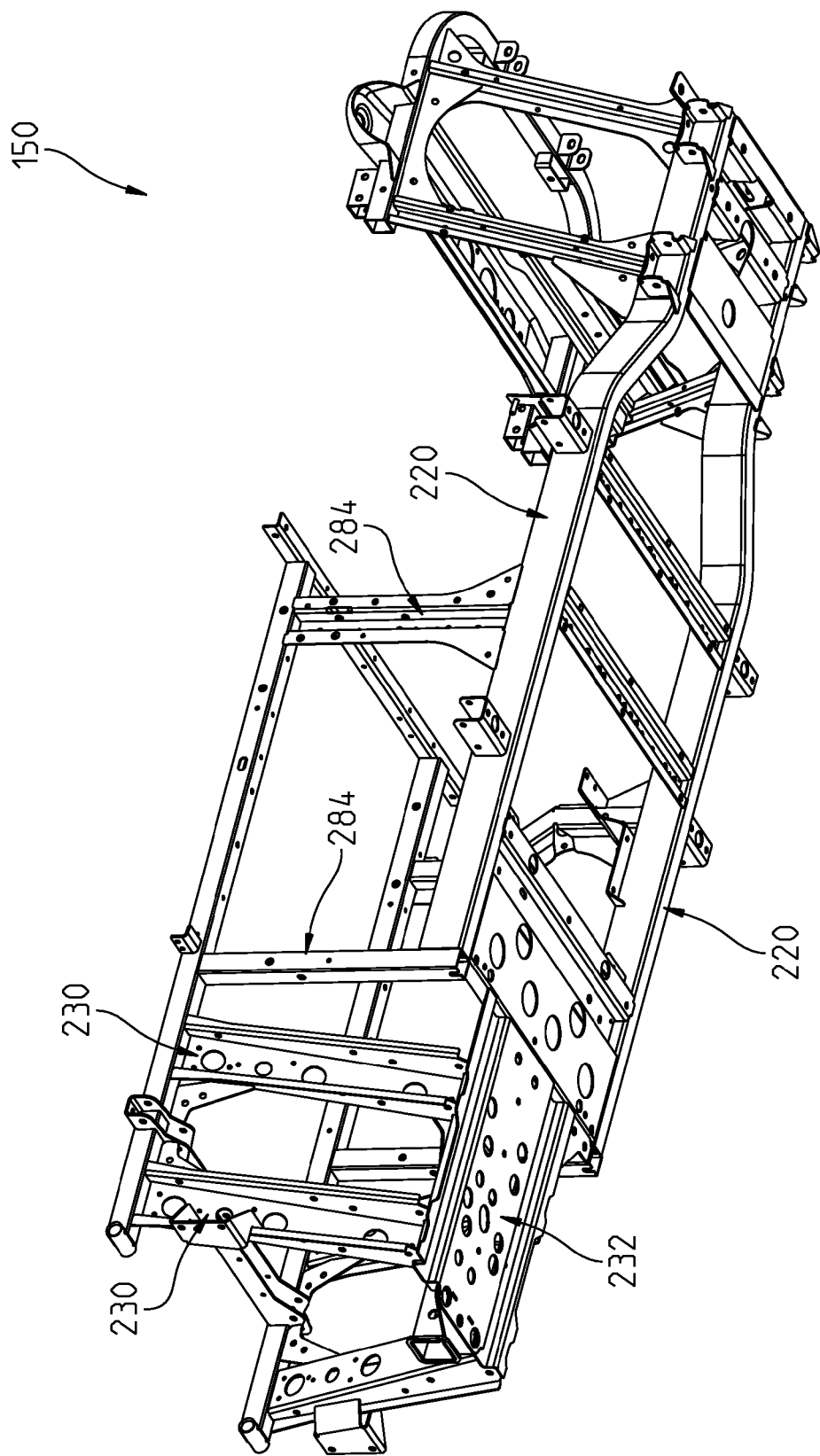
FIG. 8B illustrates a lower, perspective view of the frame of the chassis of FIG. 8.
Figure 9:
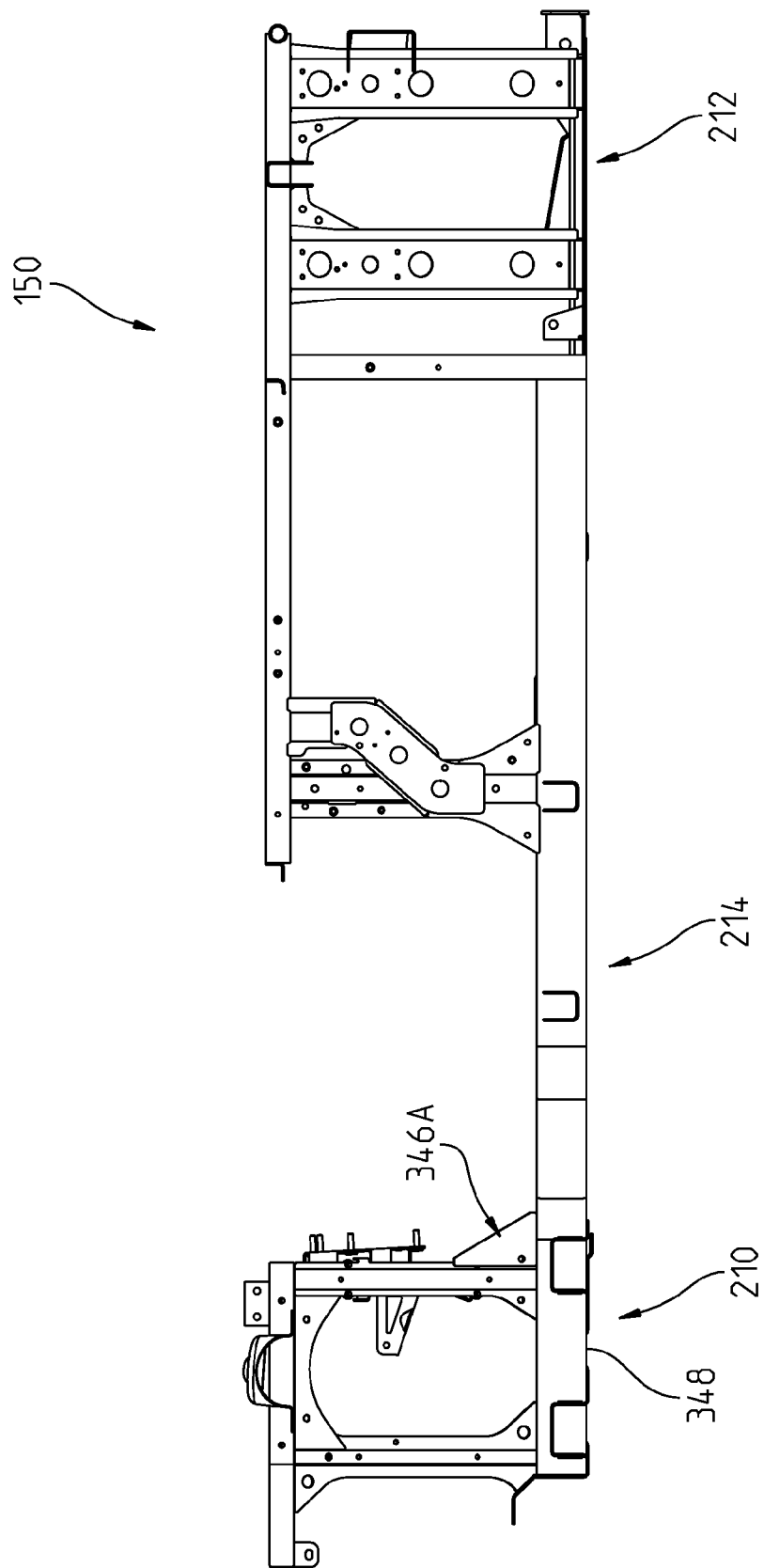
FIG. 9 illustrates a left side view of the frame of the chassis of FIG. 8.
Figure 10:
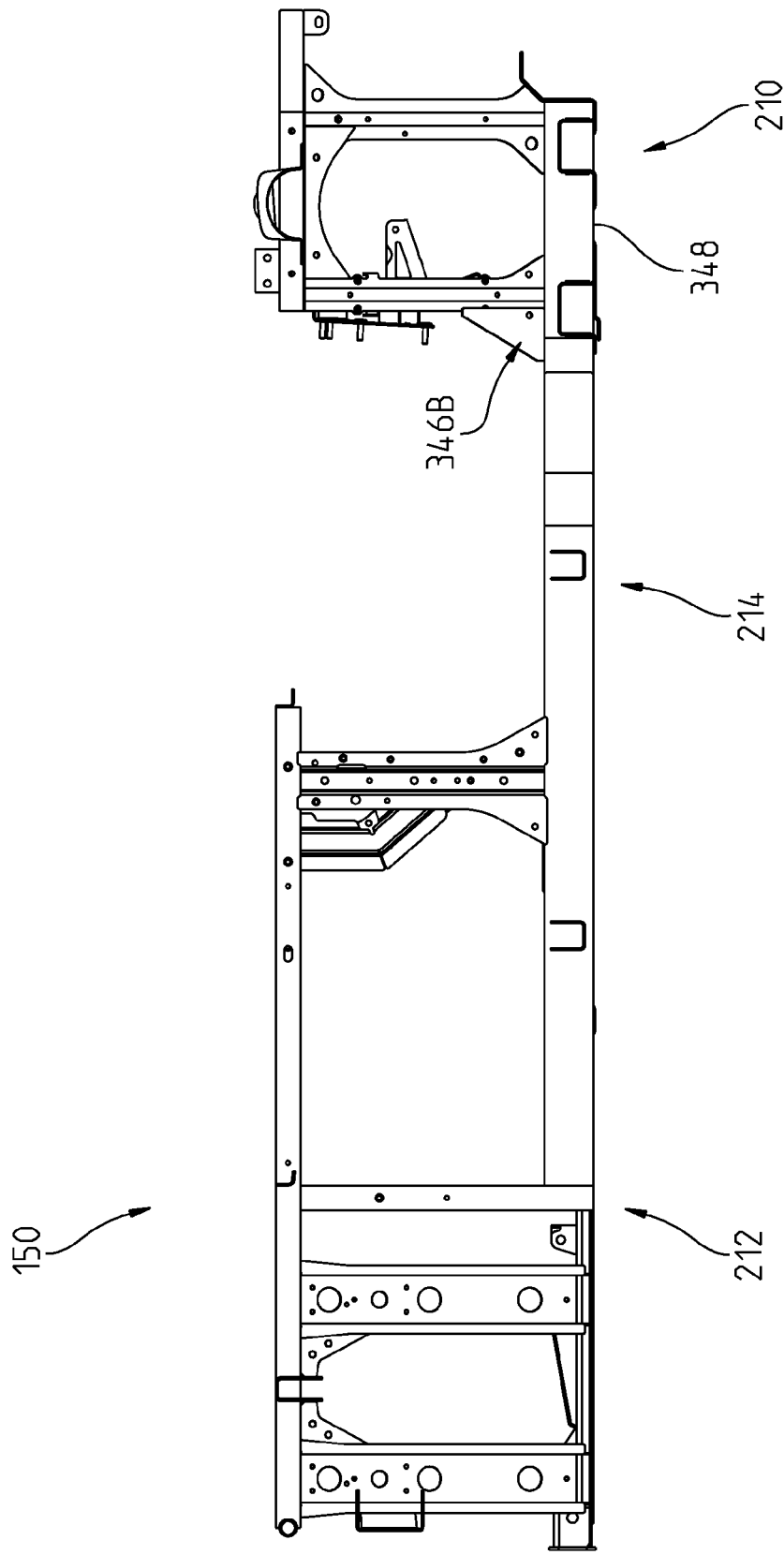
FIG. 10 illustrates a right side view of the frame of the chassis of FIG. 8.
Figure 12:
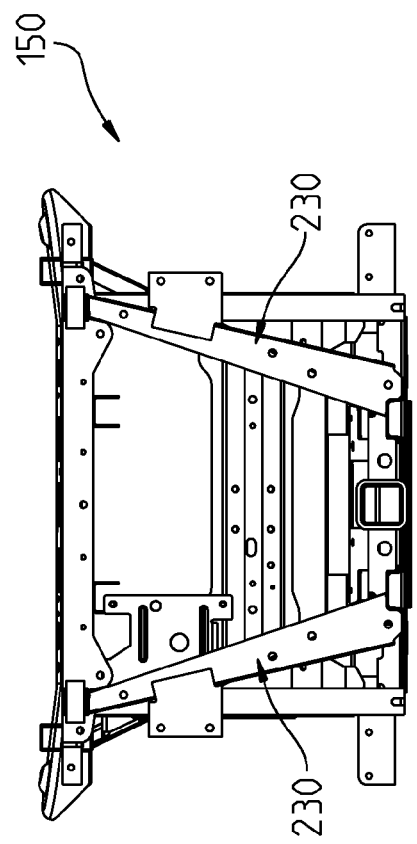
FIG. 12 illustrates a rear view of the frame of the chassis of FIG. 8.
Figure 11:
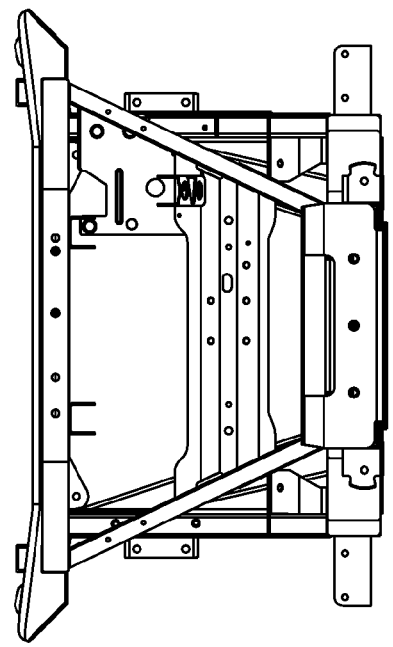
FIG. 11 illustrates a front view of the frame of the chassis of FIG. 8.
Figure 14:
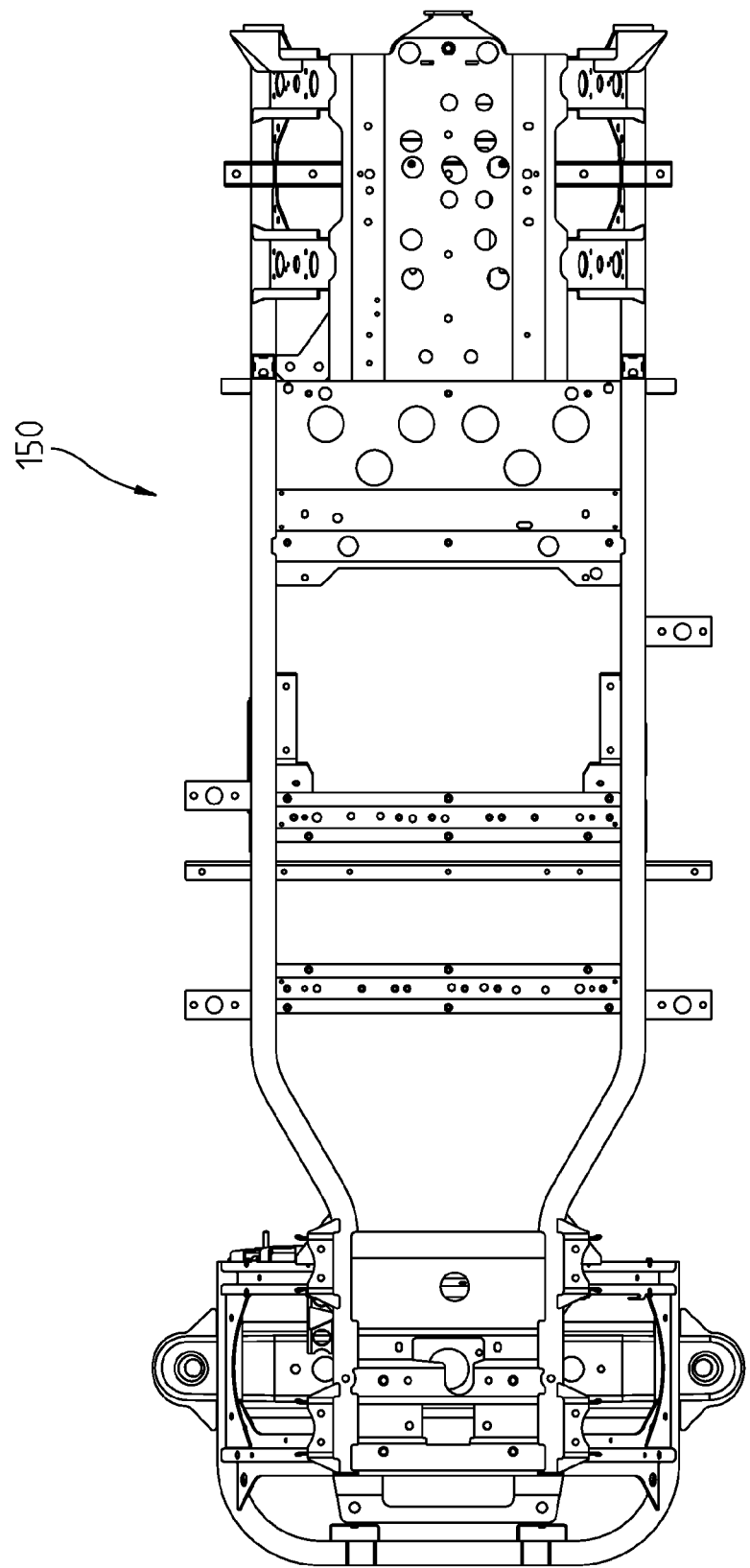
FIG. 14 illustrates a bottom view of the frame of the chassis of FIG. 8.

With respect to FIG. 8A, frame 150 will be described. Frame 150 includes longitudinally extending frame members 220 which extend a substantial length of the vehicle and neck down to form front frame members at 222. Skid plates 224 and 226 span the frame members 222. Rear frame portion 212 is defined by channel members 230 extending from a transverse portion 232.

Intermediate frame portion 214 is comprised of transverse channels 240 extending between longitudinally extending frame members 220 and transverse channel portions 242 and 244 extending outwardly from longitudinally extending frame members 220. Frame tube 262 (see FIG. 8) is positioned at the end of transverse channel portions 242 and frame tube 264 is positioned at the end of transverse channel portions 244.

With respect again to FIG. 8 and FIG. 22, seat support platform 216 is supported by upper frame members 270 which are elevated from the longitudinal extending support members 220 by way of vertical support members 284.

Figure 15:
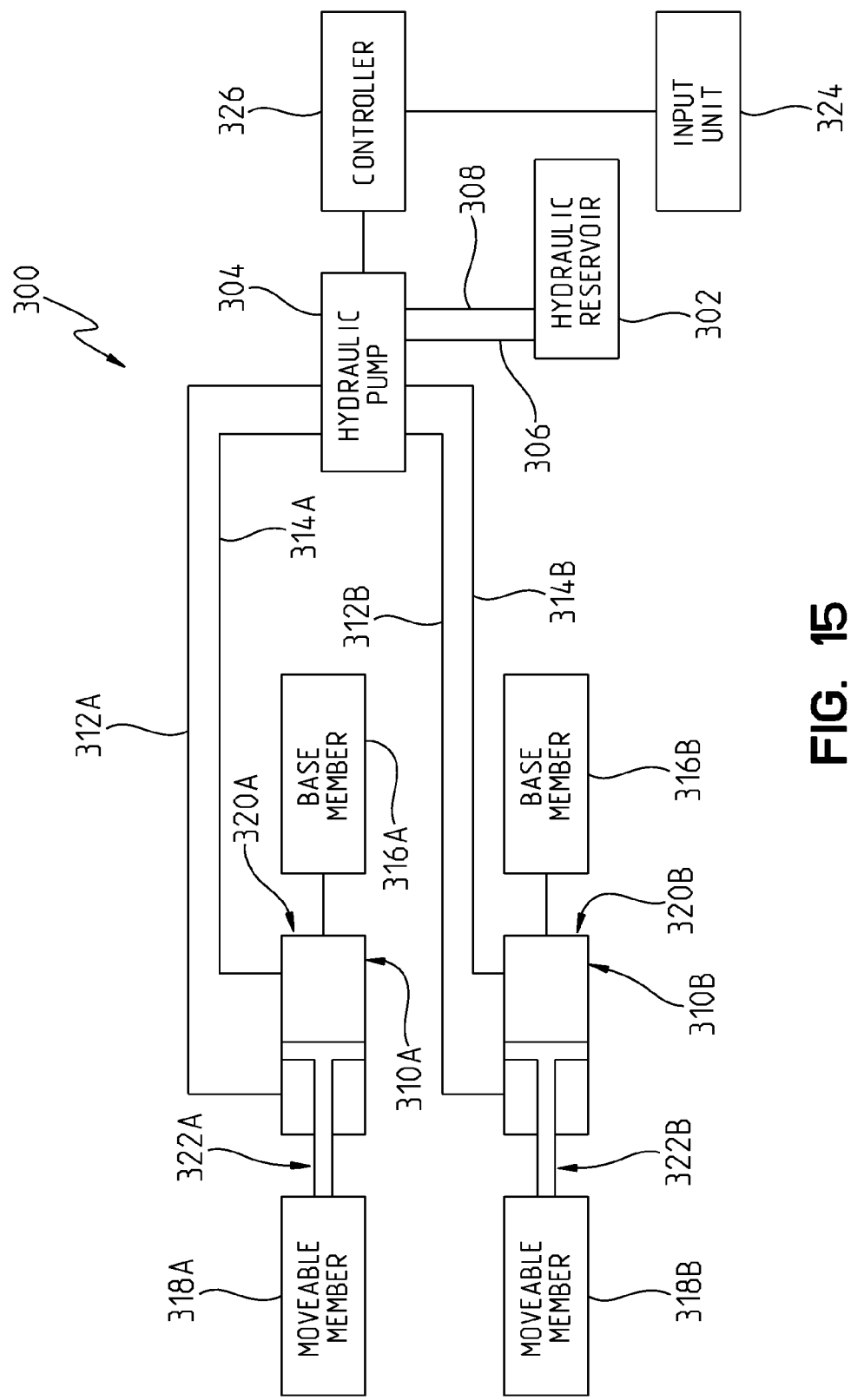
FIG. 15 illustrates a representative view of an exemplary hydraulic system.

Referring to FIG. 15, an exemplary hydraulic system 300 is shown. Hydraulic system 300 includes a hydraulic reservoir 302 which contains hydraulic fluid. The hydraulic fluid within hydraulic reservoir 302 is in fluid communication with a hydraulic pump 304 through hydraulic lines 306 and 308. Hydraulic pump 304 pumps a portion of the hydraulic fluid under pressure to one or more hydraulic cylinders 310 through hydraulic lines 312 and 314.

A first portion 320 of hydraulic cylinders 310 is coupled to a base member 316 and a second portion 322 of hydraulic cylinders 310 is coupled to a moveable member 318. By adjusting the position of the second portion 322 relative to the first portion 320, the position of moveable member 318 relative to base member 316 may be adjusted. In one embodiment, a length of hydraulic cylinders 310 is adjusted. In one embodiment, hydraulic system 300 is a push-pull system, wherein a length of a given hydraulic cylinders 310 is lengthened when hydraulic fluid is provided under pressure through hydraulic line 314 to hydraulic cylinders 310 and a length of a given hydraulic cylinders 310 is shortened when hydraulic fluid is provided under pressure through hydraulic line 312. In one embodiment, the operation of hydraulic pump 304 is controlled through an operator input unit 324.

Figure 16:
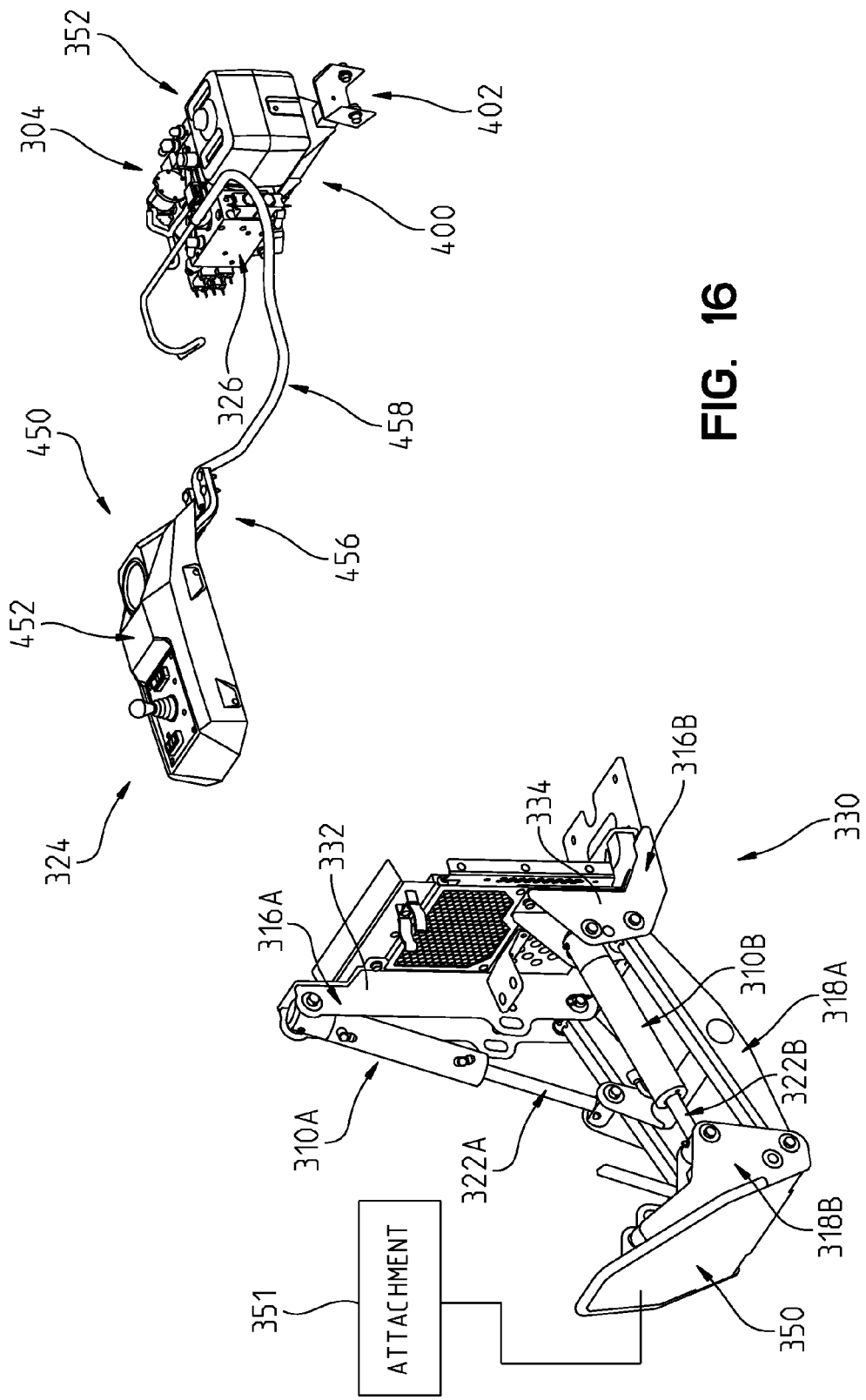
FIG. 16 illustrates a front perspective view of portions of the exemplary hydraulic system of FIG. 15.

Referring to FIG. 16, an exemplary embodiment of hydraulic system 300 is shown without the connecting hydraulic lines. Hydraulic cylinder 310A and hydraulic cylinder 310B are coupled to a support member 330. Support member 330 includes a first upstanding channel member 332 which is coupled to hydraulic cylinder 310A and a second upstanding channel member 334 which is coupled to hydraulic cylinder 310B. Upstanding channel member 332 and upstanding channel member 334 are coupled to a base member 336 which is in turn coupled to a first vertical frame member 338 of frame 150, a second vertical frame member 342 of frame 150, and an upper frame member 341 of frame 150 (as shown in FIG. 24B). A bottom member 340 of base member 336 is coupled to a skid plate 224 of frame 150 (as shown in FIG. 24B). As shown in FIG. 24B, a grill member 343 is also coupled to frame 150 in the same general area as support member 330. Grill member 343 supports a retaining member 392 for hydraulic cylinder 310B as described herein. Frame 150 includes gussets 346A and 346B (see FIGS. 9 and 10) to strengthen front frame portion 210 to support a load applied to the front of vehicle 100. The load generally being one or more attachments and potentially cargo supported by support member 330. In one embodiment, the thickness of skid plate 224 is about 0.135 inch.

As shown in FIG. 16, hydraulic cylinder 310A is rotatably coupled to a moveable member 318A which is generally H-shaped and rotatably coupled to support member 330. Hydraulic cylinder 310B is rotatably coupled to support member 330 and is rotatably coupled to a moveable member 318B which has a trapezoidal coupling member 350. Coupling member 350 may be releasably coupled to various attachments 351. Exemplary attachments include a bucket, a mower, a pallet fork, a snow blade, and a whisker push broom. In one embodiment, the attachment may support one or more hydraulic cylinders which move one portion of the attachment relative to another portion of the attachment. One example would be a lateral tilt capability of a snow blade. Auxiliary hydraulic connections are supported by support member 330 for attachment to a hydraulic cylinder of the attachment 351. In one embodiment, the auxiliary hydraulic connections are supported by bracket 337 (see FIG. 24B) coupled to base member 336. Moveable member 318B is supported by moveable member 318A and is moveably relative to moveable member 318A. In one embodiment, moveable member 318A and moveable member 318B are part of the RAPIDLINK brand attachment system available from The Bobcat Company located in Fargo, N. Dak.

Figure 24A:
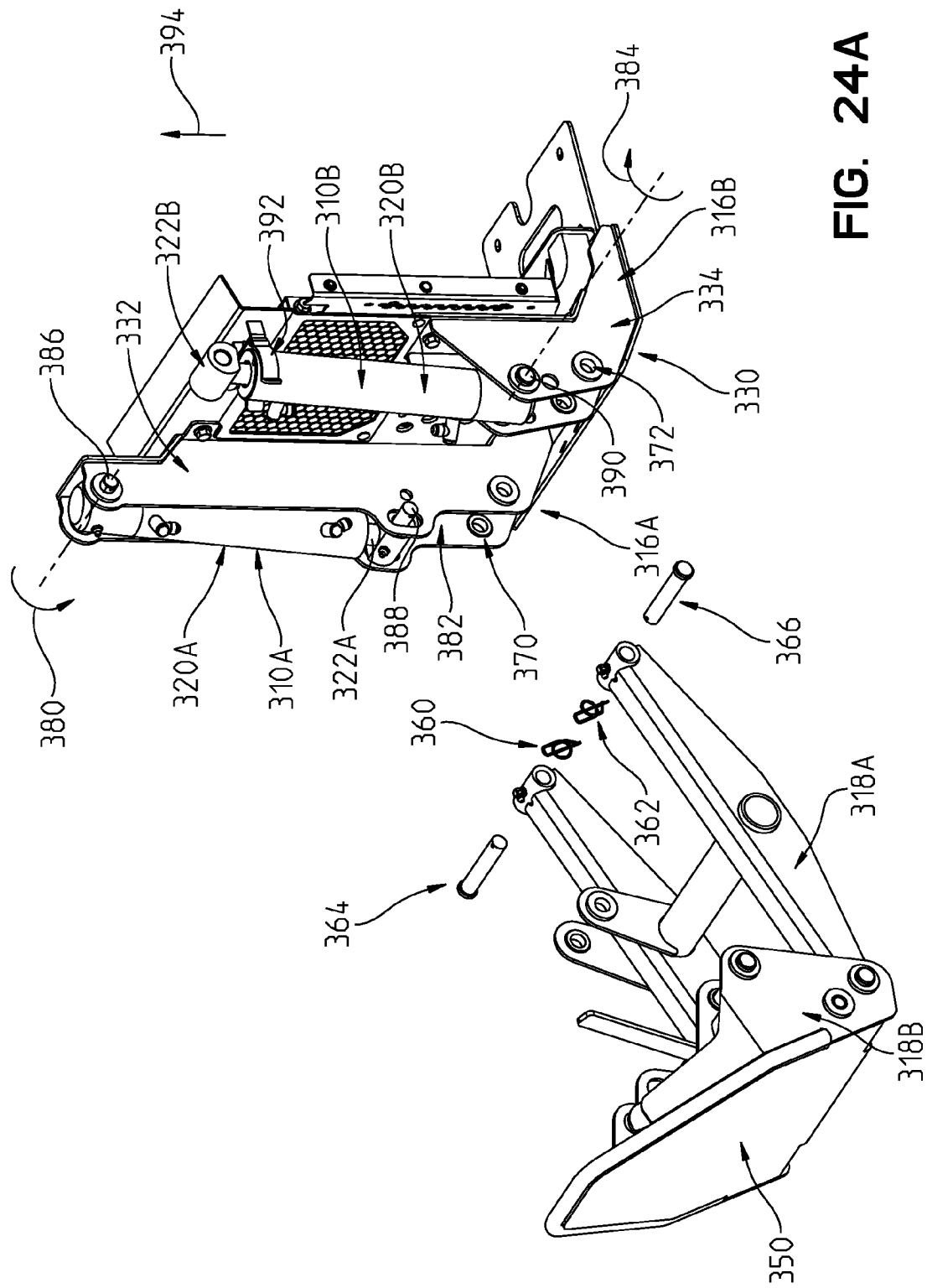
FIG. 24A illustrates a front attachment unit separated from the exemplary vehicle of FIG. 1.
Figure 24B:
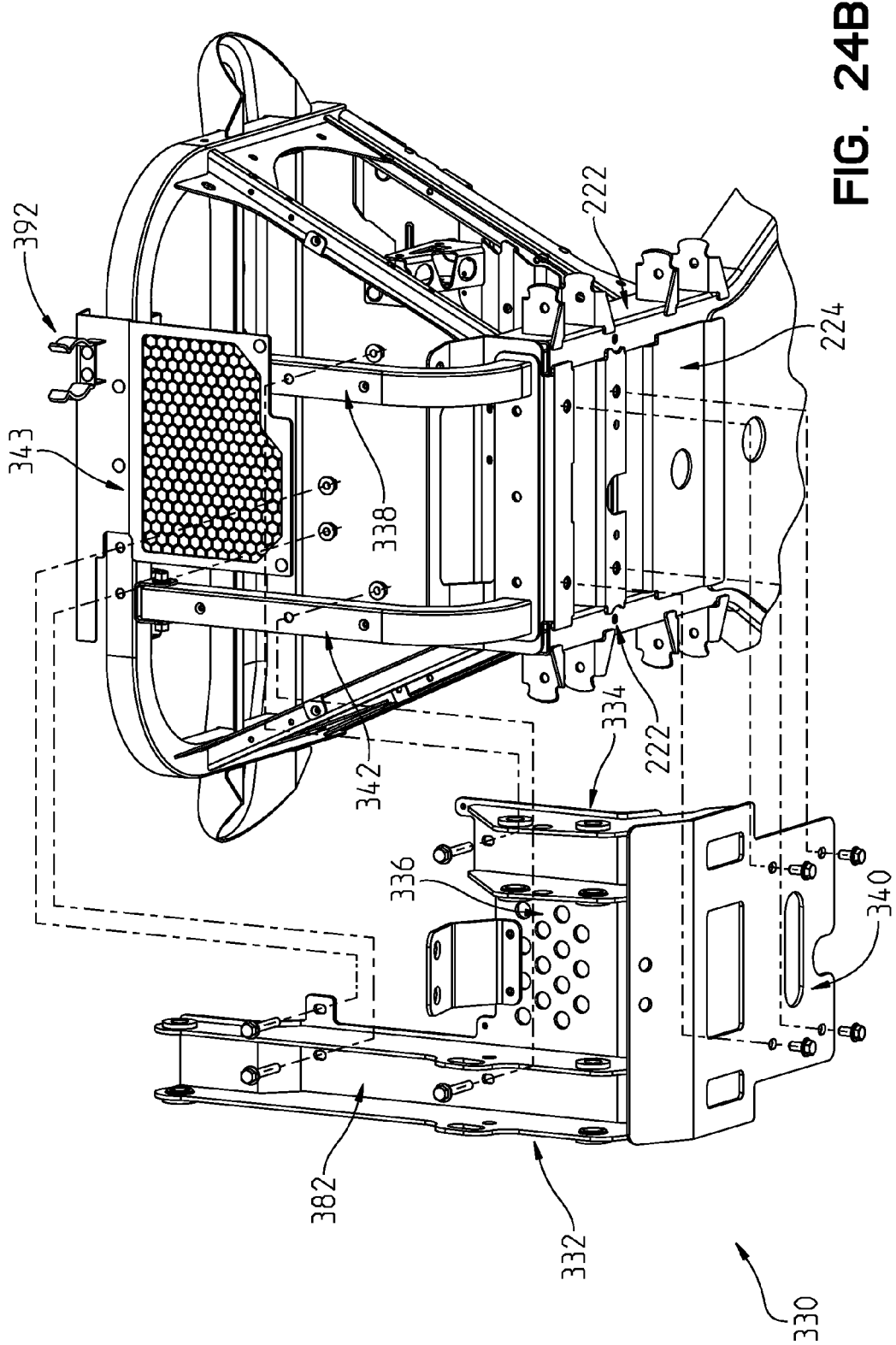
FIG. 24B illustrates the support unit separated from the frame of the vehicle.

Referring to FIG. 24, moveable member 318A is detachable from support member 330 by removing clip 360 and clip 362 which generally secure corresponding pin 364 and pin 366 in opening 370 and opening 372 of support member 330, respectively. In order to completely remove moveable member 318A and moveable member 318B from vehicle 100, hydraulic cylinder 310A and hydraulic cylinder 316B must be uncoupled from moveable member 318A and moveable member 318B, respectively. Hydraulic cylinder 310A and hydraulic cylinder 310B are each coupled to moveable member 318A and moveable member 318B, respectively, through a pin and clip, like pin 364 and clip 360.

When moveable member 318A and moveable member 318B are uncoupled from vehicle 100, hydraulic cylinder 310A is rotatable in direction 380 about a pin 386 and received in a channel 382 of upstanding channel member 332 for storage. The second portion 322A of hydraulic cylinder 310A is secured by a pin 388 to upstanding channel member 332. This prevents hydraulic cylinder 31 OA from being inadvertently lengthened. Further, hydraulic cylinder 310B is rotatable in direction 384 about pin 390 and received in a retaining member 392. Retaining member 392 is illustratively a clip. In one embodiment, retaining member 392 is a rubber coated clip. Unlike second portion 322A, second portion 3223 is not constrained, but rather may be lengthened in direction 394.

Referring to FIG. 20, hydraulic reservoir 302 and hydraulic pump 304 are positioned rearward of rear axle 110. The placement of hydraulic reservoir 302 and hydraulic pump 304 assists in balancing the weight of vehicle 100 relative to front axle 108 and rear axle 110. Referring to FIG. 25, hydraulic reservoir 302 and hydraulic pump 304 are positioned above rear axle 110. Hydraulic reservoir 302 and hydraulic pump 304 are supported by a base member 400. As shown in FIG. 17, base member 400 includes a first channel member 402 and a second channel member 404 which generally match the shape of upstanding frame member 406 (see FIG. 25) and upstanding frame member 408 (see FIG. 25), respectively. Base member 400 is coupled to upstanding frame member 406 and upstanding frame member 408 through a plurality of fasteners. In one embodiment, base member 400 is welded to upstanding frame member 406 and upstanding frame member 408.

Returning to FIG. 25, hydraulic reservoir 302 may be filled through an opening covered by a removable fill cap 303. In one embodiment, hydraulic reservoir 302 is made from a translucent or semi-transparent material which permits visual inspection of the fluid level within hydraulic reservoir 302 from an exterior of hydraulic reservoir 302. In one embodiment, only a portion of hydraulic reservoir 302 is made from a translucent or semi-transparent material which permits visual inspection of the fluid level within hydraulic reservoir 302 from an exterior of hydraulic reservoir 302.

Figure 5:
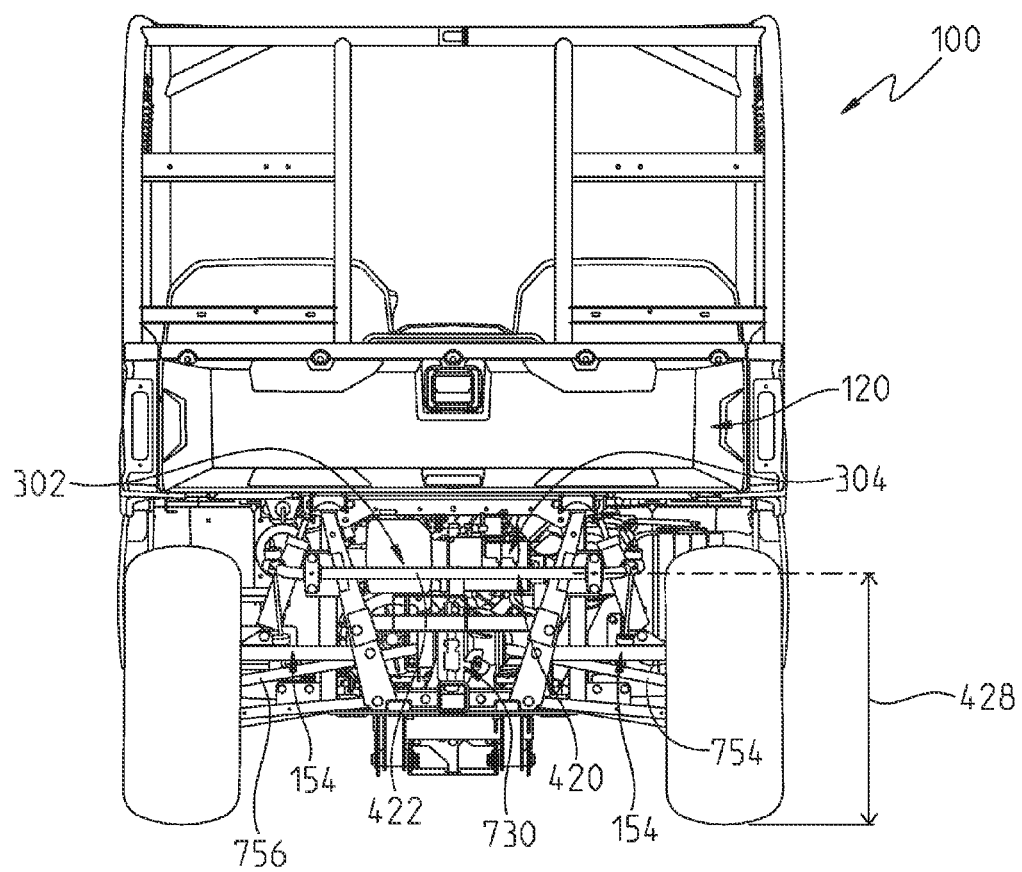
FIG. 5 illustrates a rear view of the exemplary utility vehicle of FIG. 1.
Figure 6:
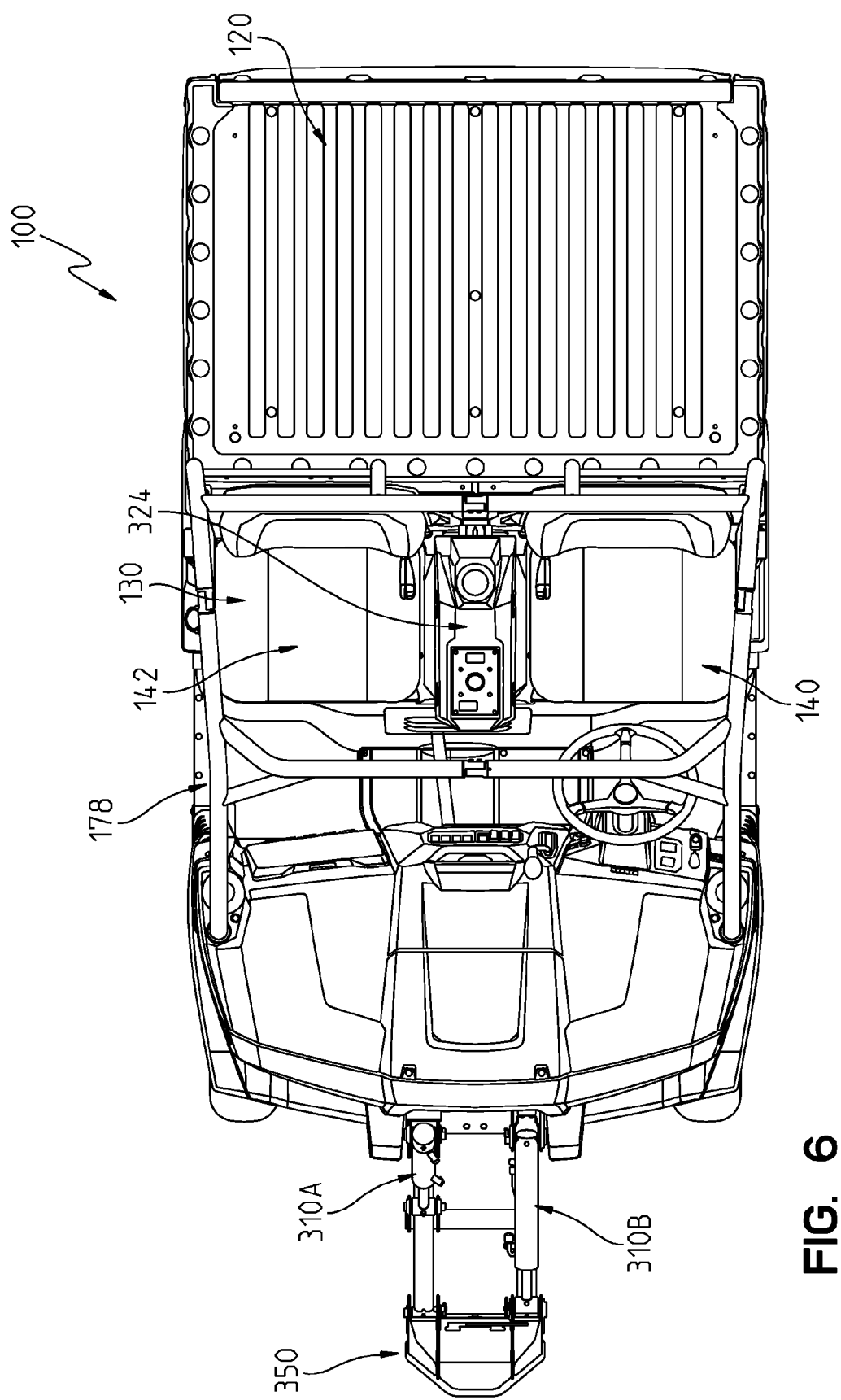
FIG. 6 illustrates a top view of the exemplary utility vehicle of FIG. 1.
Figure 7:
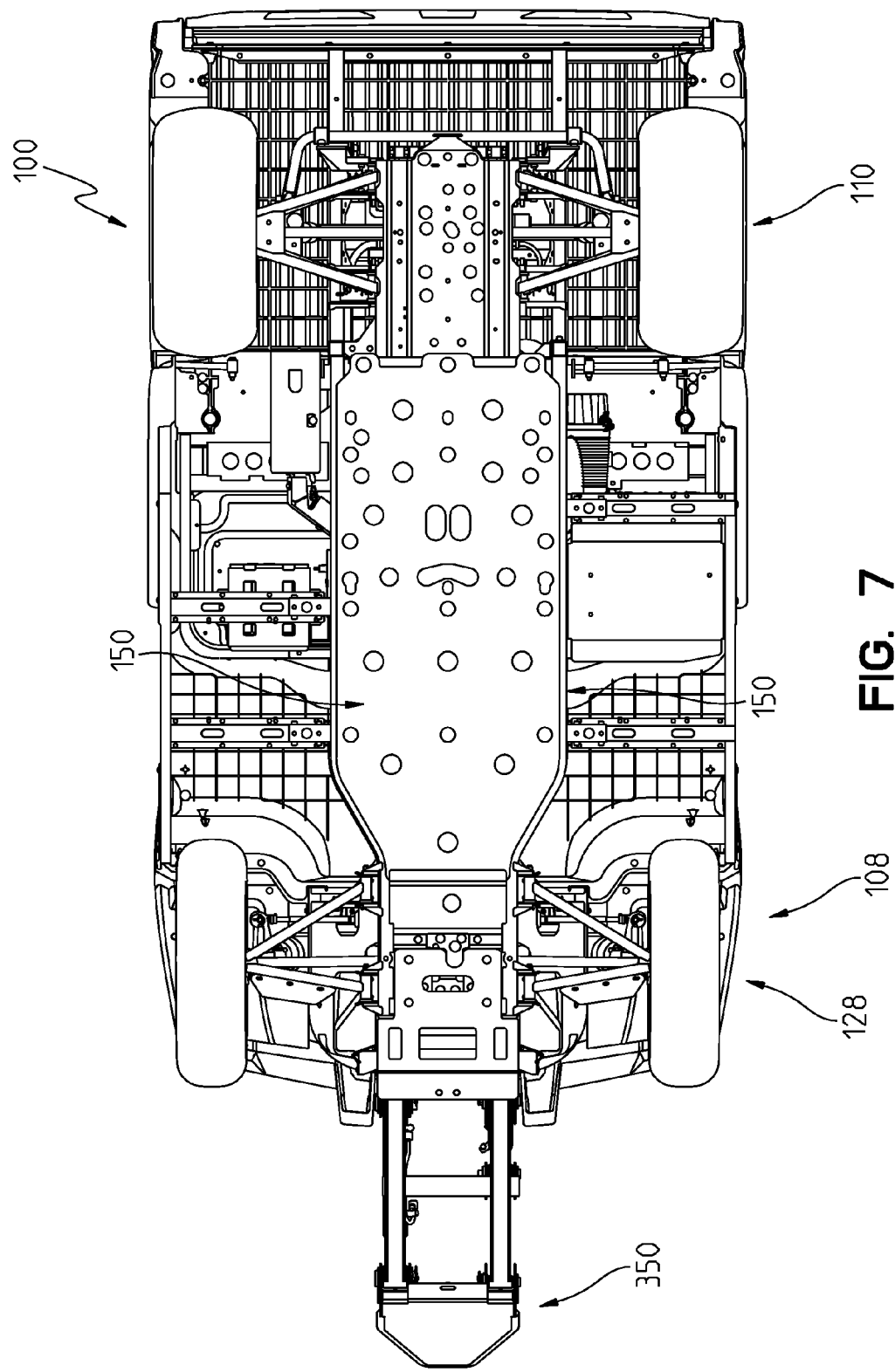
FIG. 7 illustrates a bottom view of the exemplary utility vehicle of FIG. 1.

As shown in FIG. 25 and FIG. 5, a sway bar 420 is coupled to an upper A-arm 154 of each of the rear suspensions 152. Sway bar 420 generally assists in stabilizing vehicle 100 as vehicle 100 is cornering. Sway bar 420 includes a middle portion 422, a first end portion 424, and a second end portion 426. First end portion 424 and second end portion 426 are angled relative to middle portion 422. In the illustrated embodiment, sway bar 420 is generally U-shaped. Referring to FIG. 20, an interior region 156 of sway bar 420 is indicated.

Sway bar 420 is rotatably coupled to frame 150. Mounting member 430 and mounting member 432 are coupled to upstanding frame member 406 and upstanding frame member 408, respectively. Carrier 434 and carrier 436 are removably coupled to mounting member 430 and mounting member 432, respectively. Carrier 434 and carrier 436 support sway bar 420 so that sway bar 420 is rotatable relative to frame 150. As shown in FIG. 5, middle portion 422 of sway bar 420 is positioned rearward of a rear end of the frame 150 at a first height 428.

As shown in FIG. 5, sway bar 420 overlaps hydraulic reservoir 302 and hydraulic pump 304. Sway bar 420 provides some protection for hydraulic reservoir 302 and hydraulic pump 304 from debris and objects which may otherwise contact hydraulic reservoir 302 and hydraulic pump 304 when vehicle 100 is moved backwards.

Returning to FIG. 16, operator input unit 324 is shown. Operator input unit 324 is part of a console 450. Console 450 includes an arm rest portion 452 and a cup holder 454. In one embodiment, the arm rest continues up a right hand side of the console 450 to provide a wrist support. Console 450 also includes a frame 456 which is removably coupled to a frame member 460 (see FIG. 8) of frame 150. Operator input unit 324 is coupled to controller 326 through a wiring harness 458.

Figure 2:
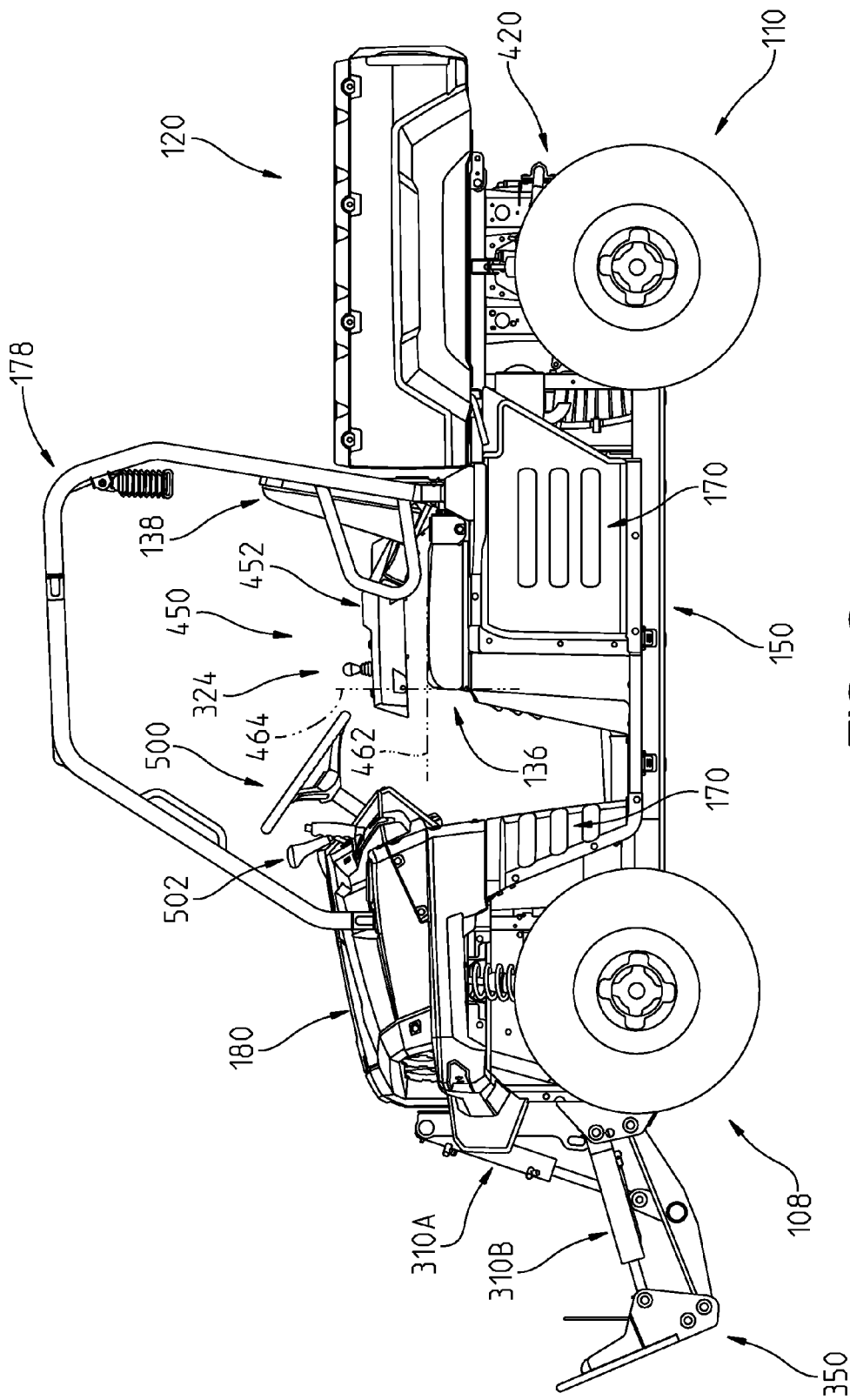
FIG. 2 illustrates a left side view of the exemplary utility vehicle of FIG. 1.
Figure 3:
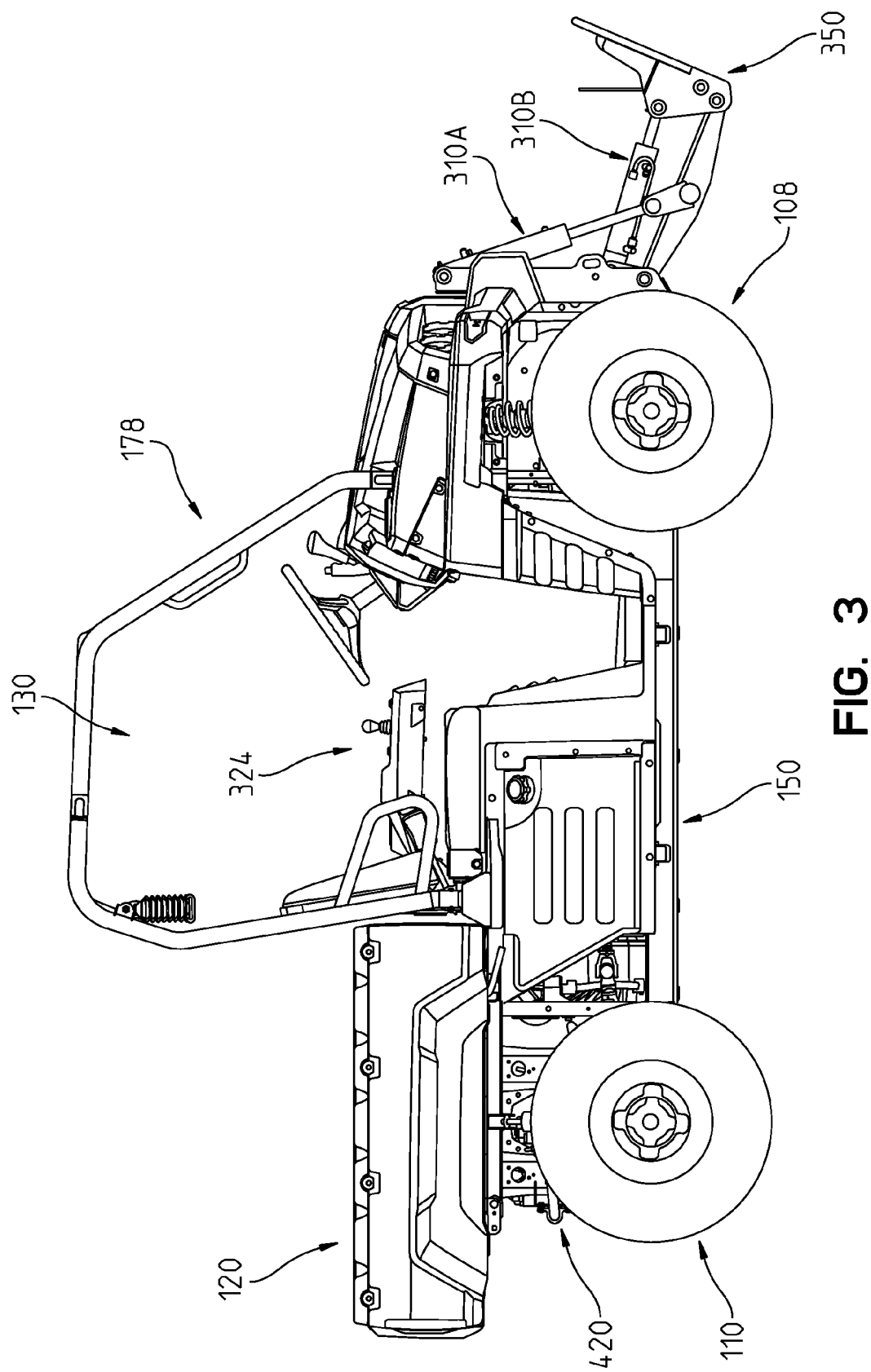
FIG. 3 illustrates a right side view of the exemplary utility vehicle of FIG. 1.
Figure 4:
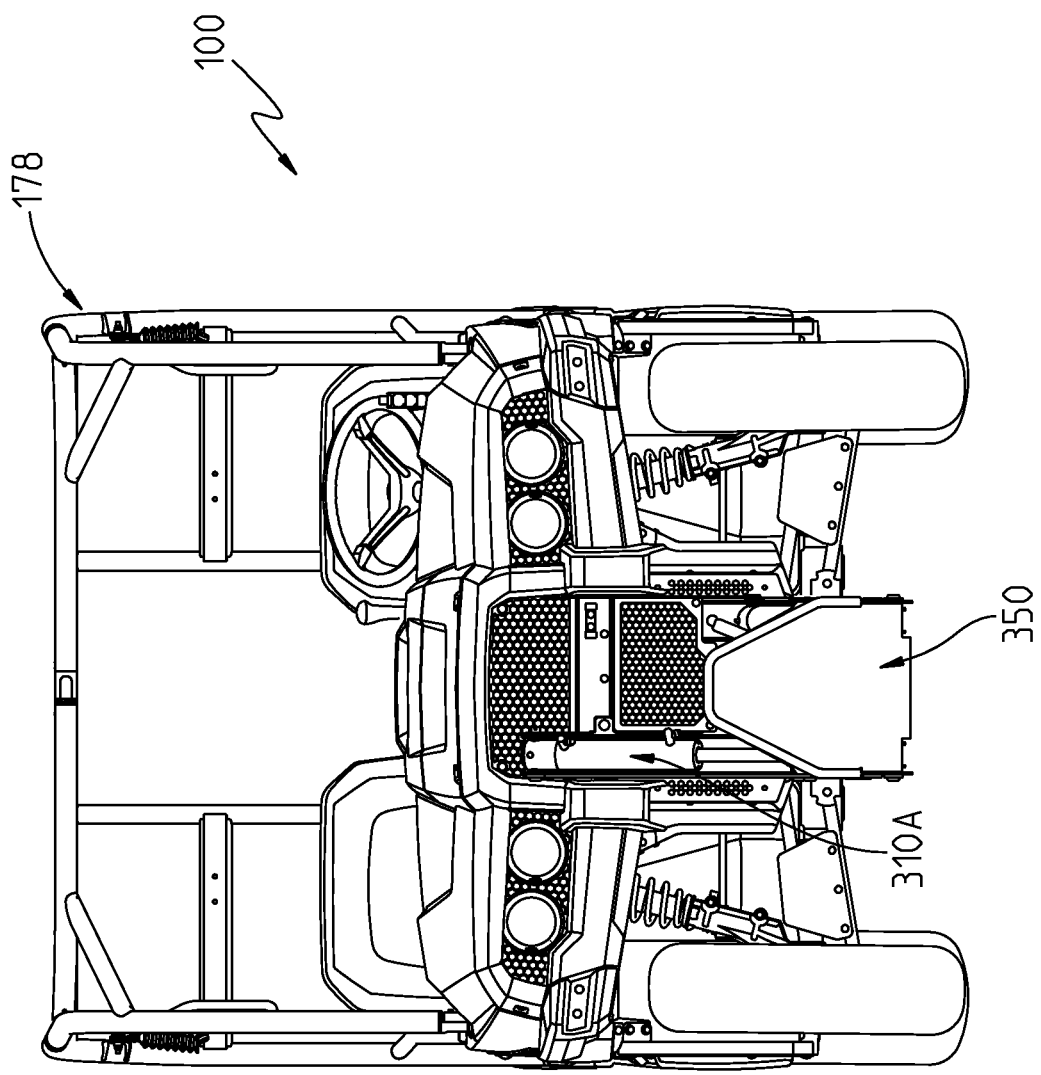
FIG. 4 illustrates a front view of the exemplary utility vehicle of FIG. 1.

Referring to FIG. 2, console 450 is supported over seat bottom portion 136 of seating 132 and is spaced apart from a top horizontal plane 462 of seat bottom portion 136. In the illustrated embodiment, console 450 also extends forward of a front vertical plane 464 of seat bottom portion 136. In one embodiment, console 450 is even with the front vertical plane 464 of seat bottom portion 136. In one embodiment, console 450 does not extend up to front vertical plane 464 of seat bottom portion 136.

Figure 21:
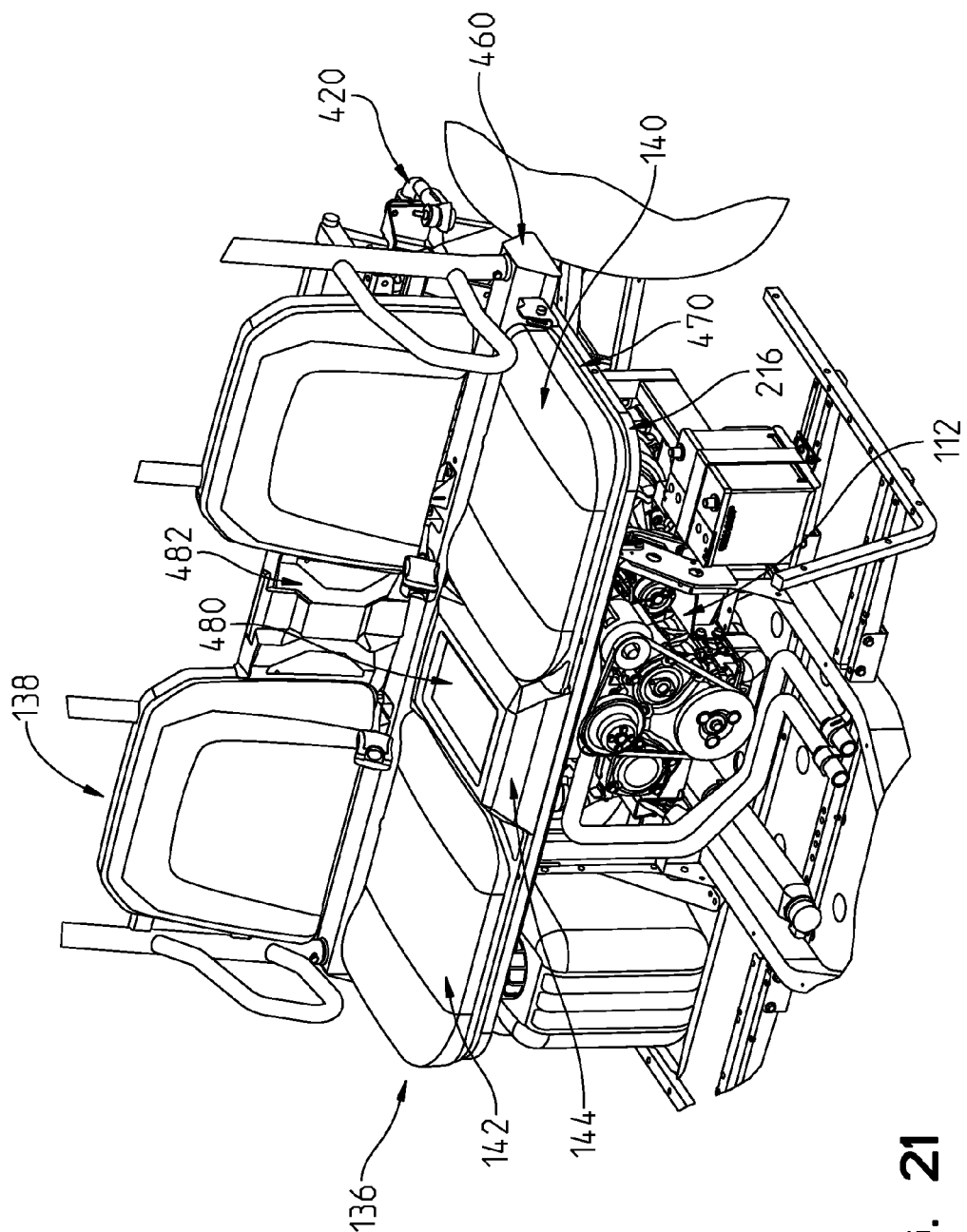
FIG. 21 illustrates a front perspective view of the seating of the exemplary vehicle of FIG. 1.
Figure 22:
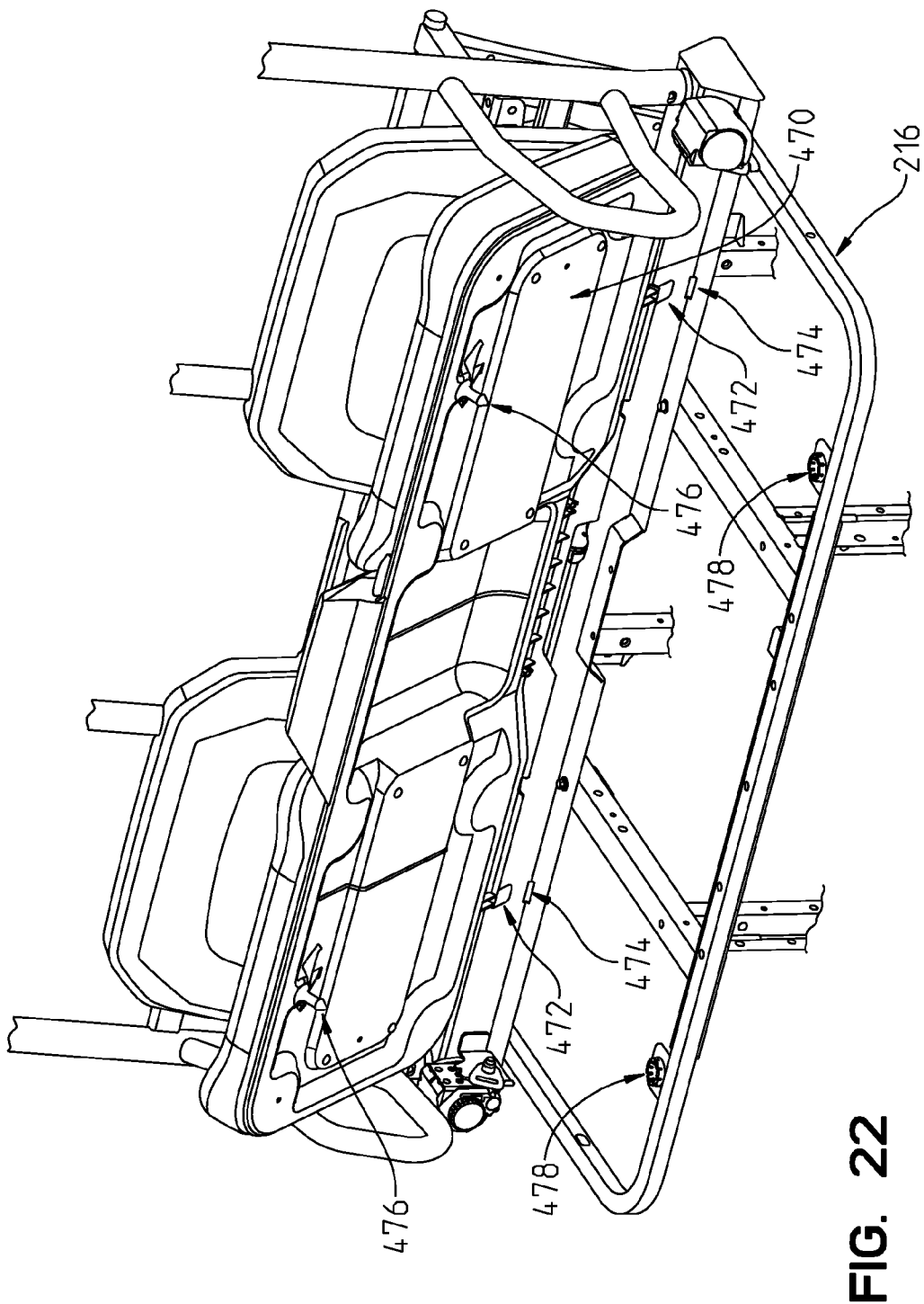
FIG. 22 illustrates the cooperation between the lower seating unit and the frame to secure the lower seating unit relative to the frame.
Figure 23:
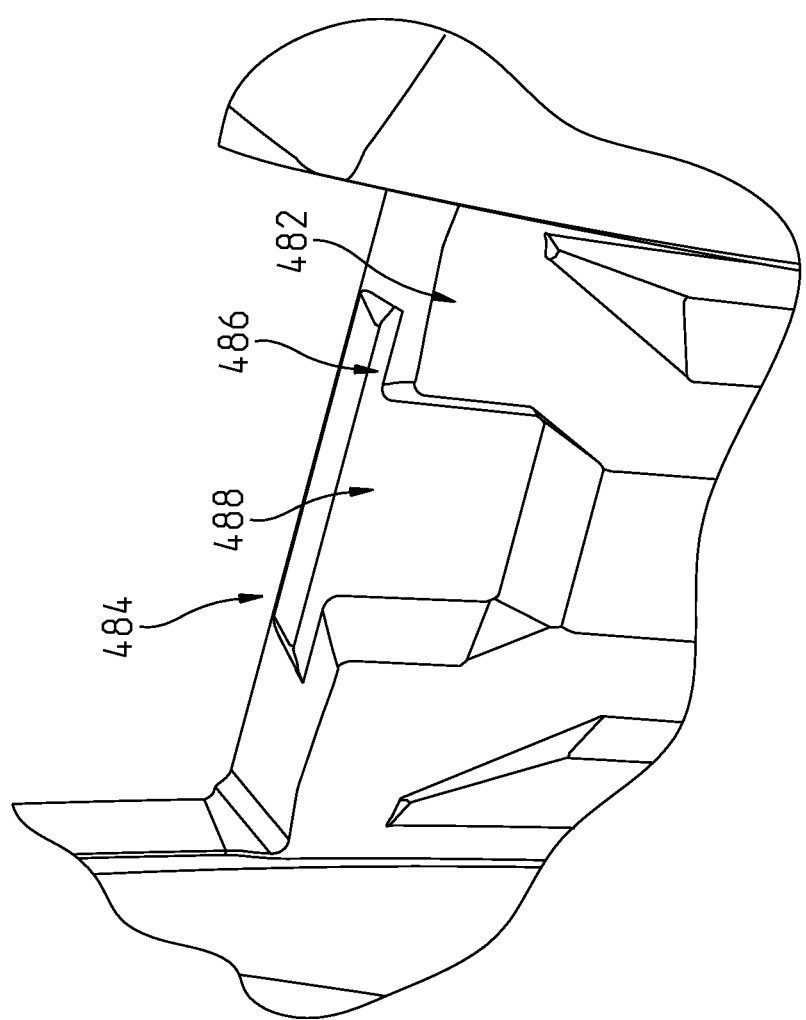
FIG. 23 illustrates a cargo carrying portion of the upper seating unit of the seating of FIG. 21.

Referring to FIG. 21, wherein console 450 has been removed to better illustrate console portion 144, seat bottom portion 136 is supported on seat support portion 216 of frame 150. Seat bottom portion 136 includes a base member 470 which extends from bucket seat 140 to bucket seat 142 and supports bucket seat 140 and bucket seat 142 as generally shown in FIG. 22. Base member 470 also forms console 414. In one embodiment, base member 470 supports a separate console 414.

Seat bottom portion 136 is removably coupled to seat support portion 216 of frame 150 to provide access to drivetrain 112. Base member 470 includes generally horizontally extending extensions 472 at the rear of base member 470 which are received in slots 474 in 216 of frame 150. Base member 470 further includes generally vertically extending extensions 476 at the front of base member 470 which are received in retainers 478 supported by seat support portion 216 of frame 150. To couple seat bottom portion 136 to seat support portion 216 of frame 150, extensions 472 are placed in slots 474 while extensions 476 are spaced apart above retainers 478. Once extensions 472 are received in slots 474, seat bottom portion 136 is rotated downward resulting in extensions 476 being received in retainers 478 thereby securing seat bottom portion 136 relative to seat support portion 216 of frame 150. To uncouple seat bottom portion 136 from seat support portion 216 of frame 150, the front portion of seat bottom portion 136 is rotated upward resulting in extensions 476 being spaced apart above retainers 478 and seat bottom portion 136 is moved forward towards dash 176.

Seat bottom portion 136 may be uncoupled from seat support portion 216 of frame 150 and coupled to seat support portion 216 of frame 150 in the manner described above while console 450 remains coupled to frame 150 in the position shown in FIG. 2. Thus, generally full access to the engine area, including maintenance interfaces, such as fill tubes for oil, is provided without having to alter a position of console 450. Once uncoupled, seat bottom portion 136 may be moved out of operator area 130 by moving seat bottom portion 136 laterally or positioned on the floor in front of seat support portion 216 of frame 150. In one embodiment, console 450 is rotatably coupled to frame member 460 or seating 138. In this embodiment, seating 138 provides a recess for receiving console 450 so that console 450 may be stored when not in use.

Returning to FIG. 21, console portion 144 includes a recessed cargo carrying portion 480. In one embodiment, recessed cargo carrying portion 480 is sized to receive letter size paper. In one embodiment, recessed cargo carrying portion 480 includes multiple recessed portions for various types of cargo. In one embodiment, console portion 144 includes a retaining member to hold cargo in recessed cargo carrying portion 480. Exemplary retaining members include a strap, a clip, a cover, and other suitable retaining members.

Seat backs 138 are separated by a body member 482. On a rear side of body member 482 an air intake 484 for a CVT of drivetrain 112 is provided. Additional details regarding the air intake 484 are provided in U.S. patent application Ser. No. 12/135,107, filed Jun. 6, 2008, the disclosure of which is expressly incorporated by reference herein.

Body member 482 further includes a cargo carrying portion 486 which is in front of air intake 484. Cargo carrying portion 486 is generally vertically oriented. In one embodiment, cargo carrying portion 486 is sized to receive an operator's manual or other literature related to vehicle 100. Body member 482 includes a recess 488 to assist in removing the literature from cargo carrying portion 486.

Figure 18:
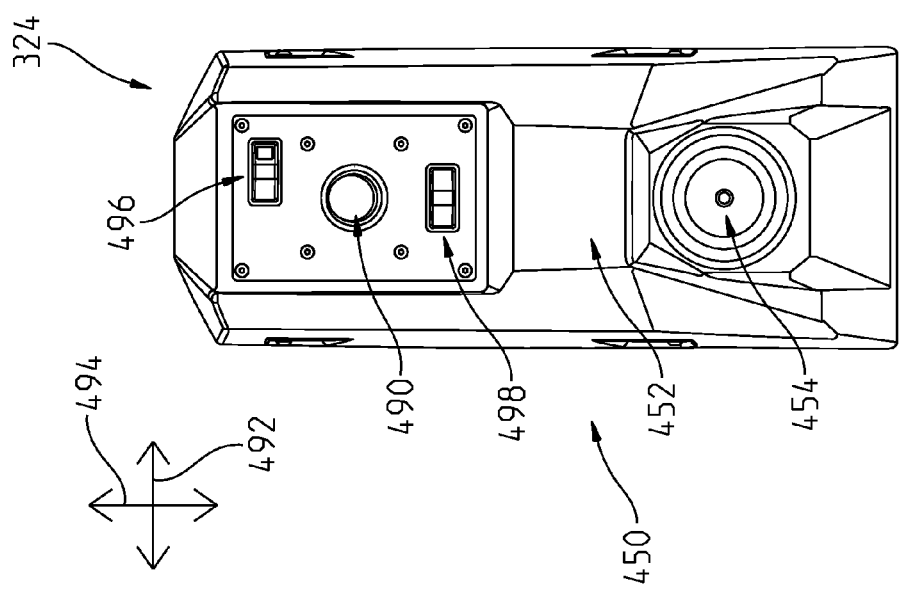
FIG. 18 illustrates a top view of an input system of the exemplary hydraulic system of the exemplary vehicle of FIG. 1.

Referring to FIG. 18, operator input unit 324 includes multiple inputs. A first input is a joystick 490. Joystick 490 is moveable generally in directions 492 and directions 494. By moving joystick 490 in one of directions 492, the operator instructs controller 326 to alter hydraulic cylinder 310B, while moving joystick 490 in directions 494, the operator instructs controller 326 to alter hydraulic cylinder 310A. A second input is a toggle switch 496. In a first position, toggle switch 496 instructs controller 326 to allow hydraulic cylinder 310A and hydraulic cylinder 310B to float. As such, an attachment, such as a broom, is able to adjust to the contour of the ground. In a second position, toggle switch 496 instructs controller 326 to not allow hydraulic cylinder 310A and hydraulic cylinder 310B to float. As such, an attachment, such as a grader does not follow the contour of the ground. A third input is a toggle switch 498. Toggle switch 498 instructs controller 326 to control the operation of one or more auxiliary hydraulic cylinders 310 coupled to vehicle 100.

Returning to FIG. 2, operator controls 134 includes a steering wheel 500 whereby an operator may provide input to a steering system to alter a direction of travel of vehicle 100. In one embodiment, the steering system includes a power steering system. An exemplary power steering system is disclosed in U.S. patent application Ser. No. 12/135,107, the disclosure of which is expressly incorporated by reference herein. Operator controls 134 further include a gear selector input 502. Gear selector input 502 is coupled to drivetrain 112 to select a gear for vehicle 100. Gear selector input 502 may be mechanically coupled to drivetrain 112 or electrically coupled to drivetrain 112. Exemplary selectable gears include low forward, high forward, neutral, and reverse. As such, if an operator wanting to perform an operation with vehicle 100 that requires repetitively forward and reverse motion, the operator generally grips steering wheel 500 with one hand and grips gear selector input 502 at multiple spaced apart instances with the other hand. If the operation being performed also requires actuation of joystick 490, the operator is moving a hand back-and-forth between gear selector input 502 and joystick 490.

Figure 19:
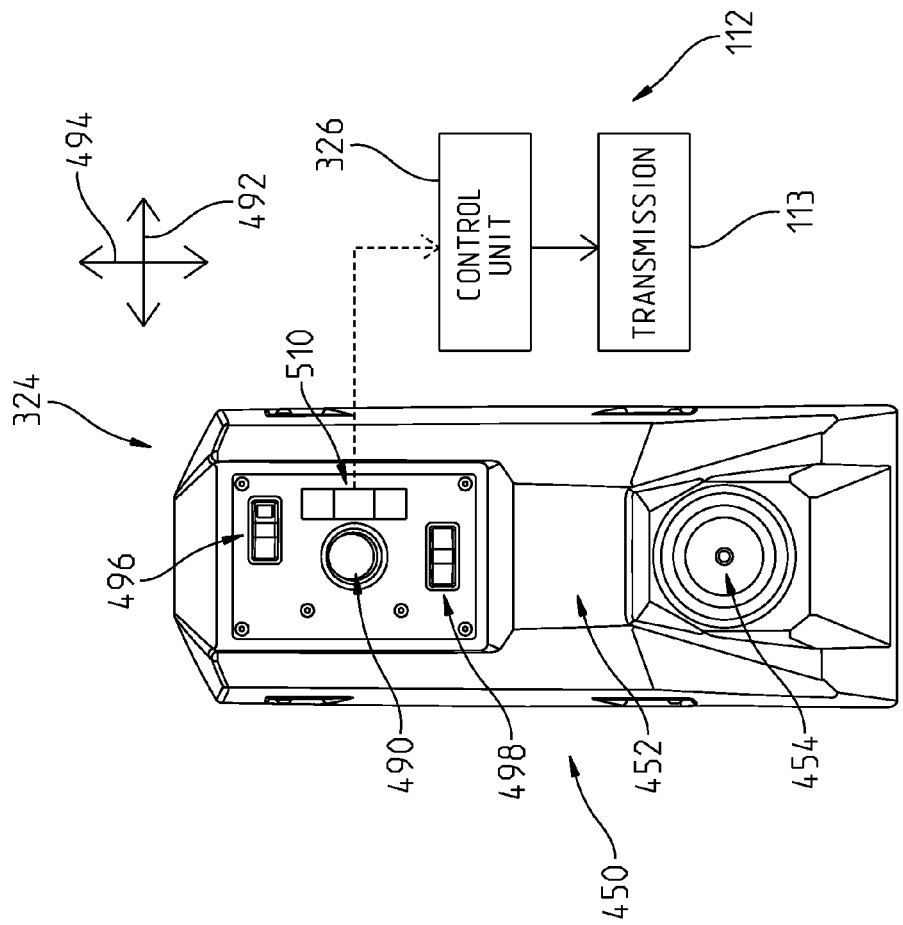
FIG. 19 illustrates a top view of another input system of the exemplary hydraulic system of the exemplary vehicle of FIG. 1.

Referring to FIG. 19, operator input unit 324, in one embodiment, includes another input 510. In the illustrated embodiment, input 510 is a three position toggle switch. In a first position, input 510 instructs controller 326 to select a forward gear of transmission 113. In one embodiment, a separate selector selects between low forward and high forward. In a second position, input 510 instructs controller 326 to select a neutral position of transmission 113. In a third position, input 510 instructs controller 326 to select a reverse gear of transmission 113. By having input 510 on console 450, the operator only has to move the hand slightly to switch between joystick 490 and input 510 likely resulting in less operator fatigue.

Figure 26:
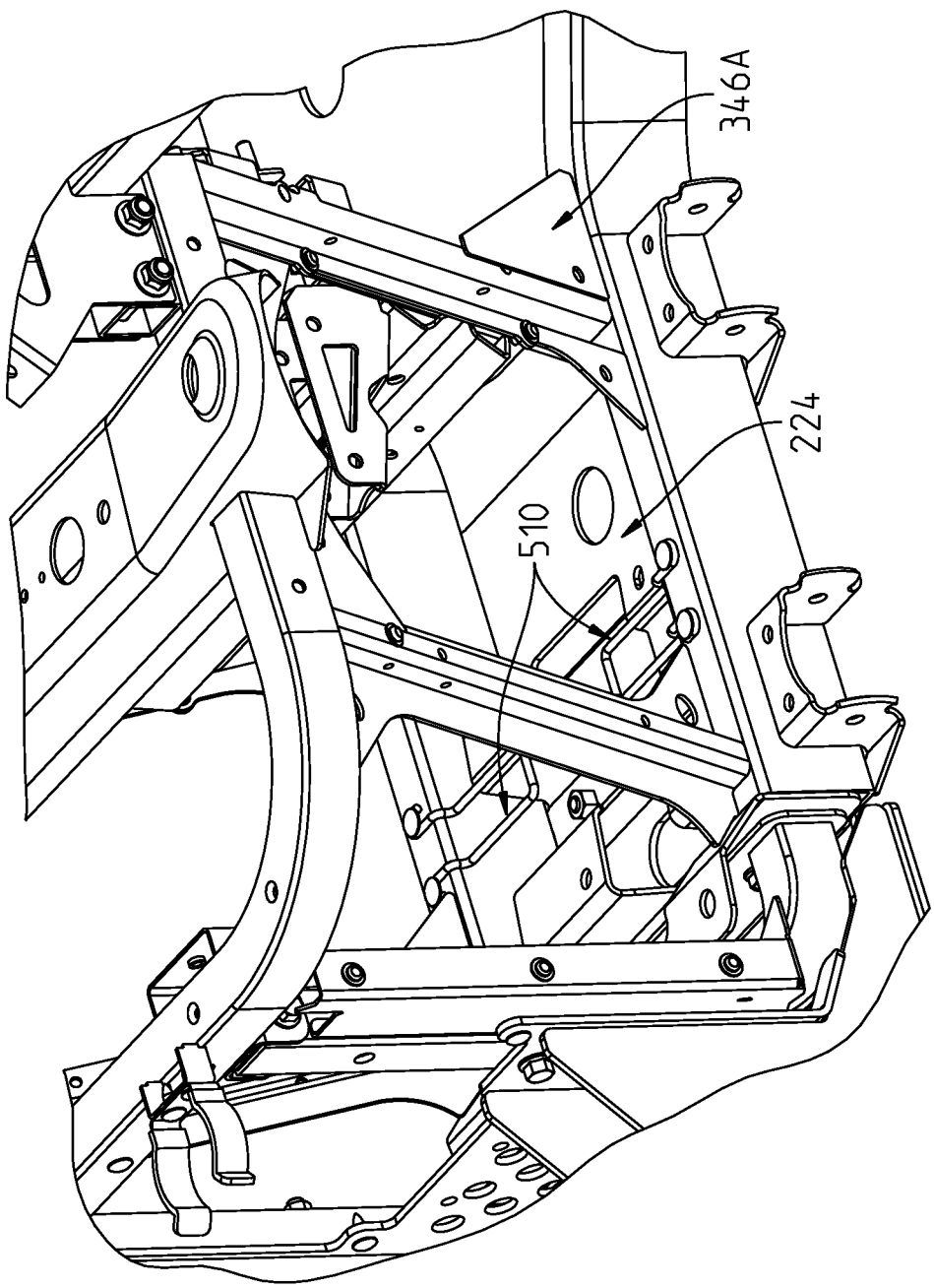
FIG. 26 illustrates retaining devices to hold hydraulic hoses against a skid plate of the frame.

With hydraulic cylinder 310A and hydraulic cylinders 310 being positioned at the front of vehicle 100 and hydraulic pump 304 positioned at the back of vehicle 100, the connecting hydraulic lines must transverse the vehicle. In one embodiment, retaining members hold the various hydraulic lines at various locations, to keep the hydraulic lines spaced apart from heat sources. In various locations p-clamps are used to hold the hydraulic lines to the frame. Referring to FIG. 26, wire forms 510 are provided to hold the hydraulic lines generally against skid plate 224 of front portion 210 of frame 150. Wire forms 510 extend from frame members 220 of frame 150.

In one embodiment, a vehicle is provided. The vehicle comprising plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and a prime mover supported by the frame and operatively coupled to at least the first ground engaging member of the plurality of ground engaging members to propel the vehicle. The prime mover being positioned completely rearward of a front lateral plane of the operator area. The vehicle further comprising a CVT operatively coupled to the prime mover and the first ground engaging member, the CVT transferring power from the prime mover to the first ground engaging member; a first suspension coupling the first ground engaging member to the frame; a second suspension coupling the second ground engaging member to the frame; a first drive unit operatively coupled to the CVT and to the first ground engaging member, the first drive unit transferring power from the CVT to the first ground engaging member and being positioned rearward of the prime mover; and a sway bar coupled to the first suspension member and the second suspension member, the sway bar supported by the frame at a location rearward of the first drive unit.

In one embodiment, a vehicle is provided. The vehicle comprising plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and a prime mover supported by the frame and operatively coupled to at least the first ground engaging member of the plurality of ground engaging members to propel the vehicle. The prime mover being positioned completely rearward of a front lateral plane of the operator area. The vehicle further comprising a CVT operatively coupled to the prime mover and the first ground engaging member, the CVT transferring power from the prime mover to the first ground engaging member; a first suspension coupling the first ground engaging member to the frame; a second suspension coupling the second ground engaging member to the frame; a first drive unit operatively coupled to the CVT and to the first ground engaging member, the first drive unit transferring power from the CVT to the first ground engaging member and being positioned rearward of the prime mover; and a sway bar coupled to the first suspension member and the second suspension member, the sway bar supported by the frame at a location rearward of the first drive unit. The vehicle further comprising a hydraulic system including a hydraulic reservoir and a hydraulic pump, both the hydraulic reservoir and the hydraulic pump being positioned rearward of a rear axle of the vehicle.

In one embodiment, a vehicle is provided. The vehicle comprising plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and a prime mover supported by the frame and operatively coupled to at least the first ground engaging member of the plurality of ground engaging members to propel the vehicle. The prime mover being positioned completely rearward of a front lateral plane of the operator area. The vehicle further comprising a CVT operatively coupled to the prime mover and the first ground engaging member, the CVT transferring power from the prime mover to the first ground engaging member; a first suspension coupling the first ground engaging member to the frame; a second suspension coupling the second ground engaging member to the frame; a first drive unit operatively coupled to the CVT and to the first ground engaging member, the first drive unit transferring power from the CVT to the first ground engaging member and being positioned rearward of the prime mover; and a sway bar coupled to the first suspension member and the second suspension member, the sway bar supported by the frame at a location rearward of the first drive unit. The vehicle further comprising a hydraulic system including a hydraulic reservoir and a hydraulic pump, both the hydraulic reservoir and the hydraulic pump being positioned rearward of a rear axle of the vehicle. The hydraulic reservoir and the hydraulic pump are positioned forward of the sway bar.

In one embodiment, a vehicle is provided. The vehicle comprising plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and a prime mover supported by the frame and operatively coupled to at least the first ground engaging member of the plurality of ground engaging members to propel the vehicle. The prime mover being positioned completely rearward of a front lateral plane of the operator area. The vehicle further comprising a CVT operatively coupled to the prime mover and the first ground engaging member, the CVT transferring power from the prime mover to the first ground engaging member; a first suspension coupling the first ground engaging member to the frame; a second suspension coupling the second ground engaging member to the frame; a first drive unit operatively coupled to the CVT and to the first ground engaging member, the first drive unit transferring power from the CVT to the first ground engaging member and being positioned rearward of the prime mover; and a sway bar coupled to the first suspension member and the second suspension member, the sway bar supported by the frame at a location rearward of the first drive unit. The vehicle further comprising a hydraulic system including a hydraulic reservoir and a hydraulic pump, both the hydraulic reservoir and the hydraulic pump being positioned rearward of a rear axle of the vehicle. The hydraulic reservoir and the hydraulic pump are positioned forward of the sway bar. When viewed from a direction normal to a longitudinal axis of the vehicle the sway bar overlaps a portion of the hydraulic reservoir and the hydraulic pump.

In one embodiment, a vehicle is provided. The vehicle comprising plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and a prime mover supported by the frame and operatively coupled to at least the first ground engaging member of the plurality of ground engaging members to propel the vehicle. The prime mover being positioned completely rearward of a front lateral plane of the operator area. The vehicle further comprising a CVT operatively coupled to the prime mover and the first ground engaging member, the CVT transferring power from the prime mover to the first ground engaging member; a first suspension coupling the first ground engaging member to the frame; a second suspension coupling the second ground engaging member to the frame; a first drive unit operatively coupled to the CVT and to the first ground engaging member, the first drive unit transferring power from the CVT to the first ground engaging member and being positioned rearward of the prime mover; and a sway bar coupled to the first suspension member and the second suspension member, the sway bar supported by the frame at a location rearward of the first drive unit. The vehicle further comprising a hydraulic system including a hydraulic reservoir and a hydraulic pump, both the hydraulic reservoir and the hydraulic pump being positioned rearward of a rear axle of the vehicle. The hydraulic reservoir and the hydraulic pump are positioned forward of the sway bar. When viewed from a direction normal to a longitudinal axis of the vehicle the sway bar overlaps a portion of the hydraulic reservoir and the hydraulic pump. The prime mover is a diesel engine.

In one embodiment, a vehicle is provided. The vehicle comprising a plurality of ground engaging members; a frame supported by the plurality of ground engaging members, the frame having a rear end; an operator area supported by the frame, the operator area including driver controls and seating adapted to support at least two people in a side-by-side relationship; a prime mover supported by the frame and operatively coupled to at least one of the plurality of ground engaging members to propel the vehicle; a CVT operatively coupled to the prime mover and the at least one of the plurality of ground engaging members, the CVT transferring power from the prime mover to the first ground engaging member; a first suspension coupling a first ground engaging member to the frame; a second suspension coupling a second ground engaging member to the frame; and a sway bar coupled to the first suspension member and the second suspension member, the sway bar supported by the frame, the frame being positioned completely forward of a portion of the sway bar.

In one embodiment, a method of tying a first ground engaging member to a second ground engaging member is provided. The method comprising the steps of: coupling the first ground engaging member to a frame through a first suspension; coupling the second ground engaging member to the frame through a second suspension; coupling the first ground engaging member to a prime mover through a first drive unit and a CVT; coupling the first suspension to the second suspension through a sway bar; and coupling the sway bar to the frame at a location rearward of the prime mover, the CVT, and the first drive unit.

While this invention has been described as having an exemplary design, the present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains.

The invention claimed is:
1. A vehicle, comprising:
a plurality of ground engaging members;
a frame supported by the plurality of ground engaging members;
an operator area supported by the frame, the operator area including driver controls and seating adapted to support at least two people in a side-by-side relationship;
a prime mover supported by the frame and operatively coupled to at least one of the plurality of ground engaging members to propel the vehicle, the prime mover being operatively coupled to a first ground engaging member positioned rearward of the operator area, a second ground engaging member positioned rearward of the operator area, and a third ground engaging member positioned forward of the operator area;
a CVT operatively coupled to the prime mover and the first ground engaging member, the second ground engaging member, and the third ground engaging member, the CVT transferring power from the prime mover to the first ground engaging member, the second ground engaging member, and the third ground engaging member;
a first suspension coupling the first ground engaging member to the frame, the first suspension including a first suspension arm rotatably coupled to the frame and a first shock coupled to the frame at an upper end of the first shock and coupled to the first suspension arm at a lower end of the first shock;
a second suspension coupling the second ground engaging member to the frame, the second suspension including a second suspension arm rotatably coupled to the frame and a second shock coupled to the frame at an upper end of the second shock and coupled to the second suspension arm at a lower end of the second shock; and
a generally U-shaped sway bar having a first end portion coupled to the first suspension, a second end portion coupled to the second suspension, and a middle portion supported by the frame, the first end portion and the second end portion are longitudinally positioned between the seating and the middle portion, the generally U-shaped sway bar being rotatably coupled to the frame and the middle portion is a continuous section which extends across a central longitudinal plane of the vehicle and the middle portion is positioned rearward of a rear end of the frame, wherein the first shock and the second shock are spaced apart from an interior region of the generally U-shaped sway bar.

2. The vehicle of claim 1, wherein the generally U-shaped sway bar is completely rearward of the first shock and the second shock.

3. The vehicle of claim 1, further comprising a rear drive unit supported by the frame, the rear drive unit operatively coupling the first ground engaging member to the CVT.

4. The vehicle of claim 1, further comprising a front drive unit supported by the frame, the front drive unit operatively coupling the third ground engaging member to the CVT.

5. The vehicle of claim 4, further comprising a bed positioned rearward of the operator area, the bed including a cargo carrying surface.

6. The vehicle of claim 1, wherein the CVT is positioned completely behind the seating.

7. The vehicle of claim 6, wherein the first ground engaging member is operatively coupled to the CVT through a first output shaft and the second ground engaging member is operatively coupled to the CVT through a second output shaft, the CVT being positioned forward of the first output shaft and the second output shaft.

8. The vehicle of claim 1, wherein the seating includes a pair of bucket seats positioned in the operator area.

9. The vehicle of claim 1, wherein the middle portion of the sway bar is rearward of the first suspension and the second suspension.

10. The vehicle of claim 1, wherein the rear end of the frame is rearward of the first suspension and the second suspension.

11. The vehicle of claim 10, wherein the middle portion of the sway bar is rearward of the first suspension and the second suspension.

12. The vehicle of claim 10, wherein the middle portion of the sway bar is below an upper edge of the first ground engaging member and the second ground engaging member.

13. The vehicle of claim 12, wherein the middle portion of the sway bar is rearward of the first suspension and the second suspension.

14. The vehicle of claim 13, wherein an assembly is supported by the frame through a plurality of mounts, the assembly including the prime mover and the CVT, each of the plurality of mounts including an elastomer member which supports the assembly relative to the frame.

15. The vehicle of claim 1, further comprising a drive shaft operatively coupled to the CVT and extending under the seating and means for transferring power from the drive shaft to the third ground engaging member.

16. The vehicle of claim 1, further comprising means for rotatably coupling the sway bar to the frame.

17. The vehicle of claim 10, wherein the middle portion of the sway bar is below an upper edge of the first ground engaging member and above an output shaft operatively coupling the first ground engaging member to the CVT.

18. The vehicle of claim 17, wherein the middle portion of the sway bar is rearward of the first suspension and the second suspension.

19. The vehicle of claim 18, further comprising means for rotatably coupling the sway bar to the frame.

20. The vehicle of claim 19, further comprising a drive shaft operatively coupled to the CVT and extending under the seating and means for transferring power from the drive shaft to the third ground engaging member.

21. The vehicle of claim 18, wherein the frame includes an upstanding frame member and further comprising:
 a mounting member coupled to the upstanding frame member; and
 a carrier removably coupled to the mounting member, the carrier supporting the sway bar relative to the frame.

22. The vehicle of claim 18, wherein an assembly is supported by the frame through a plurality of mounts, the assembly including the prime mover and the CVT, each of the plurality of mounts including an elastomer member which supports the assembly relative to the frame.

23. The vehicle of claim 22, wherein the assembly further includes a shiftable transmission operatively coupled to the CVT and including a forward gear which causes the vehicle to be propelled in a forward direction and a reverse gear which causes the vehicle to be propelled in a reverse direction.

24. The vehicle of claim 23, wherein the plurality of mounts include three mounts.

25. The vehicle of claim 23, wherein the plurality of mounts include four mounts.

26. The vehicle of claim 23, wherein the plurality of mounts include a first portion positioned proximate the prime mover and a second portion positioned rearward of the first portion.

27. The vehicle of claim 22, wherein each of the plurality of mounts includes a first portion coupled to the frame and a second portion coupled to the assembly, the elastomer member coupling the first portion to the second portion.

28. The vehicle of claim 4, wherein an assembly is supported by the frame through a plurality of mounts, the assembly including the prime mover, the CVT, and a shiftable transmission operatively coupled to the prime mover through the CVT, the shiftable transmission including a forward gear which causes the vehicle to be propelled in a forward direction and a reverse gear which causes the vehicle to be propelled in a reverse direction, each of the plurality of mounts including an elastomer member which supports the assembly relative to the frame.

29. The vehicle of claim 28, further comprising a prop shaft operatively coupled to an output shaft of the assembly, the drive shaft extending forward under the seating, the drive shaft being operatively coupled to the front drive unit, the front drive unit transferring power from the drive shaft to the third ground engaging member.

30. The vehicle of claim 4, further comprising a drive shaft operatively coupled to the CVT, the drive shaft extending forward under the seating, the drive shaft being operatively coupled to the front drive unit, the front drive unit transferring power from the drive shaft to the third ground engaging member, wherein an assembly is supported by the frame through a plurality of mounts, the assembly including the prime mover and the CVT, each of the plurality of mounts including an elastomer member which supports the assembly relative to the frame, the drive shaft being coupled to an output shaft of the assembly.

* * * * *